United States Patent
Kanbe et al.

(10) Patent No.: US 8,268,284 B2
(45) Date of Patent: Sep. 18, 2012

(54) SYSTEM AND METHOD FOR PRODUCING IODINE COMPOUND

(75) Inventors: Satoshi Kanbe, Chiba (JP); Kazumi Hosono, Tokyo (JP); Masahiro Wada, Hyogo (JP)

(73) Assignee: Nippoh Chemicals Co., Ltd., Tokyo (JP)

( * ) Notice: Subject to any disclaimer, the term of this patent is extended or adjusted under 35 U.S.C. 154(b) by 111 days.

(21) Appl. No.: 12/864,915

(22) PCT Filed: Jan. 29, 2009

(86) PCT No.: PCT/JP2009/051421
§ 371 (c)(1), (2), (4) Date: Jul. 28, 2010

(87) PCT Pub. No.: WO2009/096446
PCT Pub. Date: Aug. 6, 2009

(65) Prior Publication Data
US 2010/0308261 A1 Dec. 9, 2010

(30) Foreign Application Priority Data

Jan. 31, 2008 (JP) ................................. 2008-021325
Jan. 31, 2008 (JP) ................................. 2008-021327

(51) Int. Cl.
*B01J 19/00* (2006.01)
*C01B 7/13* (2006.01)
*C01B 11/22* (2006.01)

(52) U.S. Cl. ........ 423/462; 423/472; 423/473; 423/481; 423/487; 422/129; 422/211

(58) Field of Classification Search .................. 423/462, 423/472, 473, 481, 487; 422/129, 211
See application file for complete search history.

(56) References Cited

U.S. PATENT DOCUMENTS 2,828,184 A 3/1958 Behrman
3,278,264 A 10/1966 Robinson et al.
(Continued)

FOREIGN PATENT DOCUMENTS

EP 0 714 849 6/1996
(Continued)

OTHER PUBLICATIONS

Kagakudaijiten Hensyuiinkai (ed.), "Kagakudaijiten", reduced-size 28th edition, Kyoritsu Shuppan Co., Ltd., Mar. 15, 1984, vol. 9, pp. 410-411.

(Continued)

*Primary Examiner* — Timothy Vanoy
(74) *Attorney, Agent, or Firm* — Casimir Jones SC

(57) ABSTRACT

A system (100) of the present invention for producing an iodine compound includes: a raw material adjusting unit (1) for supplying hydrogen-containing gas to at least one of liquid iodine in an iodine melting pot (4) and gaseous iodine obtained by evaporating liquid iodine so as to obtain a mixture gas; a hydrogen iodide producing unit (10) including a hydrogen iodide producing tower (12) having a catalyst layer (12a) for converting the introduced mixture gas into crude hydrogen iodide gas; a hydrogen iodide refining unit for removing unreacted iodine from the introduced crude hydrogen iodide gas so as to obtain hydrogen iodide gas; and an iodine compound producing unit (30) for producing a target iodine compound from the obtained hydrogen iodide gas and a reaction material. This allows producing an iodine compound with high purity easily, efficiently, and with low cost.

30 Claims, 1 Drawing Sheet

U.S. PATENT DOCUMENTS

| | | | |
|---|---|---|---|
| 3,402,995 A | | 9/1968 | Bach |
| 4,053,376 A | | 10/1977 | Carlin |
| 4,150,094 A | | 4/1979 | Mysels et al. |
| 4,357,309 A | | 11/1982 | Arnold et al. |
| 4,853,148 A | * | 8/1989 | Tom et al. ............... 252/194 |
| 4,925,646 A | * | 5/1990 | Tom et al. ............... 423/488 |
| 5,520,793 A | | 5/1996 | Genders et al. |
| 2010/0303708 A1 | * | 12/2010 | Kanbe et al. ............... 423/499.1 |

FOREIGN PATENT DOCUMENTS

| | | |
|---|---|---|
| JP | 31-8013 | 9/1956 |
| JP | 61-048403 | 3/1986 |
| JP | 8-059205 | 3/1996 |
| JP | 9-054197 | 2/1997 |
| JP | 9-59003 | 3/1997 |
| JP | 9-086902 | 3/1997 |
| JP | 10-87301 | 4/1998 |
| JP | 01-261224 | 10/1998 |
| JP | 2004-315332 | 11/2004 |
| JP | 2005-255514 | 9/2005 |
| JP | 2005-289936 | 10/2005 |

OTHER PUBLICATIONS

The Chemical Society of Japan (ed.), "Shinjikkenkagakukouza", Maruzen Co., Ltd., Mar. 20, 1977, vol. 8, pp. 522-523.

Jacqueline I. Kroschwitz, "Encyclopedia of Chemical Technology," Fourth Edition, John Wiley & Sons, 1996, vol. 19, pp. 1084-1085.

International Search Report dated Mar. 17, 2009, International Patent Application No. PCT/JP2009/051421.

* cited by examiner

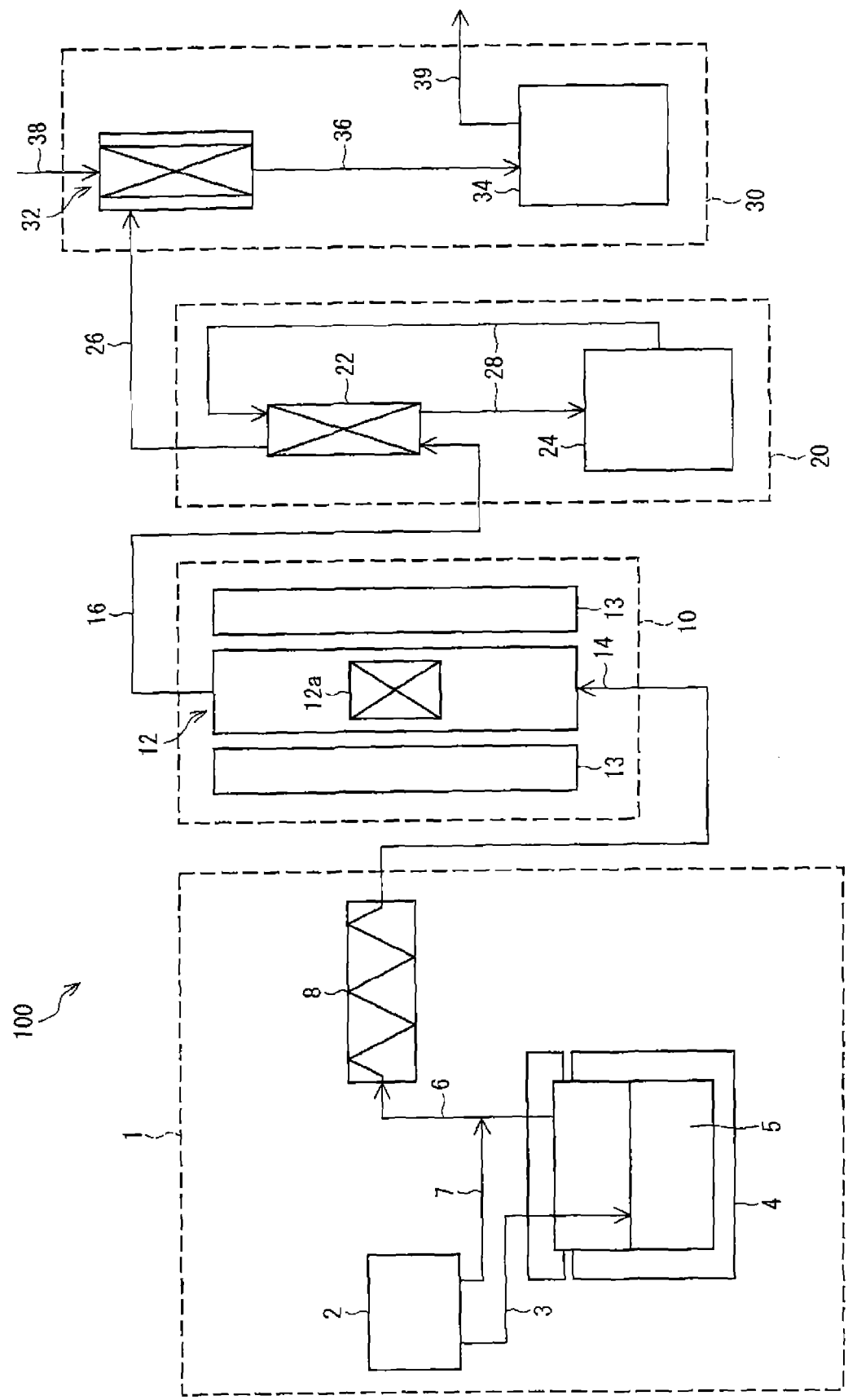

SYSTEM AND METHOD FOR PRODUCING IODINE COMPOUND

CROSS REFERENCE TO RELATED APPLICATIONS

The present application is a Section 371 U.S. national stage entry of pending International Patent Application No. PCT/JP2009/051421, international filing date Jan. 29, 2009, which claims priority to Japanese Patent Application No. 2008-021325, filed Jan. 31, 2008, and Japanese Patent Application No. 2008-021327, filed Jan. 31, 2008.

TECHNICAL FIELD

The present invention relates to a system and a method for producing an iodine compound. In particular, the present invention relates to a system and a method for producing, with a convenient process, an iodine compound with high purity.

BACKGROUND ART

Various conventional methods for producing an iodine compound have been known. Examples of the conventional methods for producing an iodine compound are disclosed in Patent Literatures 1-7 and Non-Patent Literatures 1-3 below.

Patent Literature 1 discloses a method for adding iodine to an alkaline solution and reacting the iodine with the alkaline solution to produce iodate, and thereafter reducing the produced iodate with aluminum or zinc. Patent Literature 2 discloses a method for adding iodine to an alkaline solution and thereafter reducing the iodine with hydrogen sulfide. Patent Literature 3 discloses a method for reducing iodine or iodate with alkaline metal amalgam in an alkaline circumstance or a neutral circumstance. Patent Literature 4 discloses a method for adding an organic reductant such as formic acid, oxalic acid, and malonic acid to an alkali hydroxide solution of iodine and reacting the alkali hydroxide solution of iodine. Patent Literature 5 discloses a method for adding iodine to a potassium hydroxide solution and thereafter adding formic acid as a reductant to the solution. Patent Literature 6 discloses a method for causing iodine to react with potassium hydroxide or alkali carbonate using hydrazine as a reducer. Patent Literature 7 discloses a method for adding formic acid to a potassium hydroxide solution and neutralizing the solution and thereafter adding iodine with an amount larger than stoichiometric quantity to the solution so as to make the iodine react, and processing isolated iodine in the resulting with potassium sulfide. Patent Literature 8 discloses a method for producing hydrogen iodide by catalytic reduction of hydrogen-containing gas and gaseous iodine using platinum catalyst highly dispersed in oxide or activated carbon, and a method for collecting generated hydrogen iodide gas using water or an alkali aqueous solution.

Further, Non-Patent Literature 1 describes a method for flowing, over 100° C.-heated platinum, hydrogen current in which iodine is saturated. Non-Patent Literature 2 discloses a method for producing potassium iodide by mixing and neutralizing hydriodic acid with potassium hydrogen carbonate and processing unreacted iodine with hydrogen sulfide in a weak alkaline circumstance. Non-Patent Literature 3 discloses a method for crystallizing potassium iodate which is by-produced when synthesizing potassium iodide from iodine and potassium hydroxide, and heating potassium iodate at 600° C. to decompose and remove potassium iodate.

Conventionally, a general method of producing hydrogen iodide used as a raw material of an iodine compound is to obtain hydrogen iodide by chemically reacting red phosphorus, water, and iodine. Further, another methods for producing hydrogen iodide (or hydriodic acid) include techniques disclosed in Patent Literatures 9-16.

The following specifically explains the techniques disclosed in Patent Literatures 9-16. Patent Literature 9 discloses a method for producing hydriodic acid from iodine with use of a phosphorous acid aqueous solution, a pyrophosphoric acid aqueous solution or the like as a reducer. Patent Literature 10 discloses a method for producing hydriodic acid from water, sulfur dioxide, and iodine. Patent Literature 11 discloses a method for hydrogen iodide from ammonium and iodine in the presence of an iron catalyst. Patent Literature 12 discloses a method for producing anhydrous hydrogen iodide by reaction among a phosphorus acid aqueous solution, diphosphorus pentoxide, and metal iodide. Patent Literature 13 discloses a method for producing hydrogen iodide from iodine and tetrahydronaphthalene. Patent Literature 8 discloses a method for producing hydrogen iodide by catalytically reducing hydrogen-containing gas and gaseous iodine in the presence of a catalyst. Further, Patent Literatures 14-16 disclose a method for producing hydrogen iodide with high purity by an electrochemical method.

[Patent Literature 1] U.S. Pat. No. 2,828,184, specification
[Patent Literature 2] U.S. Pat. No. 3,402,995, specification
Patent Literature 3
Japanese Examined Patent Application Publication, Tokukousho, No. 31-8013
[Patent Literature 4] Japanese Patent Application Publication, Tokukaihei No. 1-261224
[Patent Literature 5] Russian Patent No. 560826, specification
[Patent Literature 6] Japanese Patent Application Publication, Tokukaisho No. 61-48403
[Patent Literature 7] Russian patent No. 497233, specification
[Patent Literature 8] Japanese Patent Application Publication, Tokukai No. 2005-255514
[Patent Literature 9] Japanese Patent Application Publication, Tokukaihei No. 8-59205 (published on Mar. 5, 1996)
[Patent Literature 10] U.S. Pat. No. 4,150,094, specification (published on Apr. 17, 1979)
[Patent Literature 11] U.S. Pat. No. 3,278,264, specification (published on Oct. 11, 1966)
[Patent Literature 12] Japanese Patent Application Publication, Tokukaihei No. 9-86902 (published on Mar. 31, 1997)
[Patent Literature 13] U.S. Pat. No. 4,357,309, specification (published on Nov. 2, 1982)
[Patent Literature 14] Japanese Translation of PCT International Application, Tokuhyohei No. 11-503203 (published on Mar. 23, 1999)
[Patent Literature 15] U.S. Pat. No. 4,053,376, specification (published on Oct. 11, 1977)
[Patent Literature 16] Japanese Patent Application Publication, Tokukaihei No. 9-54197 (published on Feb. 25, 1997)
[Patent Literature 17] European Patent No. 0714849, specification (published on Jun. 5, 1996)
[Patent Literature 18] Japanese Patent Application Publication, Tokukai No. 2005-289936 (published on Oct. 20, 2005)
[Non-Patent Literature 1]
Kagakudaijiten hensyuiinkai (ed.), "Kagakudaijiten", reduced-size 28$^{th}$ edition, Kyoritsu Shuppan Co., Ltd., Mar. 15, 1984, Vol. 9, p 410
[Non-Patent Literature 2]
The Chemical Society of Japan (ed.), "Shinjikkenkagakukouza", MARUZEN Co., Ltd., Mar. 20, 1977, Vol. 8, p 522
[Non-Patent Literature 3]
Jacqueline I. Kroschwitz, "Encyclopedia of Chemical Technology", Forth edition, JOHN WILEY ft SONS, 1996, Vol. 19, p 1084

SUMMARY OF INVENTION

However, since the methods for producing an iodine compound which are disclosed in Patent Literatures 1-7 and Non-patent Literatures 2 and 3 employ iodine molecules as a starting material and therefore the methods are required to use a reducer. This requires the methods to remove the reducer or a byproduct when isolating the desired iodine compound. Further, some reducers are difficult to handle since they are poisonous for example.

To be more specific, in the methods disclosed in Patent Literatures 1 and 7 and Non-patent Literature 3, it is necessary to remove a byproduct after the reaction. In the methods disclosed in Patent Literatures 2, 3, and 6, it is necessary to use a reducer which is difficult to use. Further, in the methods disclosed in Patent Literatures 4 and 5, handleable reducers such as formic acid and oxalic acid are used. However, such reducers suffer slow reduction speed, and the methods yield little amounts of iodine compounds obtained with respect to iodine included in a reaction system (i.e. have low yields). In Non-patent Literature 2, it is necessary to use hydrogen sulfide in order to remove unreacted iodine. Non-patent Literature 1 does not disclose a specific method for producing hydrogen iodide. Patent Literature 8 only discloses a method for producing hydrogen iodide by catalytic reduction, and does not specifically disclose iodine compounds in general.

As described above, removal of the reducer or the byproduct or use of a reducer difficult to use would increase the number of troublesome steps. Further, the increase in the number of troublesome steps would make the production costs higher, resulting in escalating price of an end product. Therefore, there has been a request for a method for producing an iodine compound easily, efficiently, and at reduced production costs.

The present invention was made in view of the foregoing problems. A main object of the present invention is to provide a method and a system for producing an iodine compound easily, efficiently and at reduced costs.

Further, in the method for producing hydrogen iodide by reacting red phosphorus and iodine, it is necessary to remove a byproduct produced in the reaction and unreacted iodine which remains in the reaction after the reaction has been completed.

Examples of the method for removing unreacted iodine generally include a method for cooling gas including hydrogen iodide and removing iodine, and a method for reducing a hydrogen-iodide-containing solution with a reducer. However, these methods are very troublesome and have very strict process conditions, and are not efficient due to their large loss of hydrogen iodide. Therefore, it is difficult to efficiently obtain hydrogen iodide with high purity by these methods.

Further, in the method disclosed in Patent Literature 9, it is necessary to remove and reduce a byproduct by distillation or to remove unreacted iodine by activated charcoal. In the method disclosed in Patent Literature 10, it is necessary to remove by-produced sulfuric acid and unreacted iodine. In the method disclosed in Patent Literature 11, it is necessary to flow produced hydrogen iodide and unreacted iodine and ammonium through potassium hydroxide so as to remove the unreacted iodine and ammonium. In the method disclosed in Patent Literature 12, it is necessary to remove by-produced metal phosphate. In the method disclosed in Patent Literature 13, it is necessary to remove by-produced naphthalene. In the method disclosed in Patent Literature 8, it is necessary to remove unreacted iodine.

That is, also in the methods disclosed in Patent Literatures 8-13, it is still necessary to carry out a troublesome and ineffective process of removing, from produced hydrogen iodide (or hydriodic acid), unreacted iodine and iodine resulting from decomposition of hydrogen iodide. Further, conditions for a process of removing a byproduct produced in the reaction are not easy to satisfy and troublesomeness of the process is not small. Accordingly, it is still difficult to efficiently obtain hydrogen iodide with high purity by these techniques.

Examples of a method for removing at least one of unreacted iodine remaining in a reaction for producing hydrogen iodide and a byproduct produced in the reaction include: a method for processing crude hydrogen iodide with zeolite (see Patent Literature 17 for example); and a method for separating iodine from hydrogen iodide, water, and high boiling point component (see Patent Literature 18 for example).

However, zeolite used in the method disclosed in Patent Literature 17 is relatively expensive and therefore it is necessary to reproduce and reuse zeolite. Besides, zeolite itself is damaged by strongly acidic hydrogen iodide. Further, in the method disclosed in Patent Literature 18, it is necessary to distil and recover used methanol. That is, even the method disclosed in Patent Literature 18 requires a troublesome process of recovering a used material and reuse it.

Further, the techniques disclosed in Patent Literatures 14-16 use electricity for production of hydrogen iodide. Accordingly, industrial production of hydrogen iodide by these techniques requires very high production costs, making it very difficult to apply the method for electrochemically producing hydrogen iodide to industrial production.

A conventional method for obtaining hydrogen iodide by chemically reacting red phosphorus, water, and iodine is intended mainly for obtaining hydriodic acid, and the reaction is made in such a manner that hydrogen iodide gas and unreacted iodine are not produced. Therefore, almost no research has been made on removal of iodine from hydrogen iodide-containing gas. For example, although Patent Literature 8 describes a method for recovering produced hydrogen iodide-containing gas, Patent Literature 8 does not describe how to remove (separate) unreacted iodine from hydrogen iodide-containing gas.

The present invention was made in view of the foregoing problems. An object of the present invention is to easily and efficiently produce hydrogen iodide with high purity. Note that hydrogen iodide produced by the above method and hydriodic acid obtained by dissolving the hydrogen iodide in water are also provided by the present invention.

In order to solve the foregoing problem, a system of the present invention for producing an iodine compound by using hydrogen iodide gas includes a hydrogen iodide refining unit including a refining device for causing crude hydrogen iodide gas to contact with a refining solution so as to obtain hydrogen iodide gas, the crude hydrogen iodide gas being produced by causing hydrogen gas to contact with gaseous iodine in a presence of a catalyst, the refining solution dissolving a material other than hydrogen iodide and not dissolving hydrogen iodide in the crude hydrogen iodide gas.

With the above arrangement, the refining solution which dissolves a material other than hydrogen iodide and does not dissolve hydrogen iodide is used. This allows efficiently removing only a material other than hydrogen iodide from crude hydrogen iodide gas when carrying out a gas-liquid contact.

Further, the hydrogen iodide refining unit carries out refinement by a gas-liquid contact between gas and liquid. Consequently, the hydrogen iodide refining unit does not require a process of separating a refining material after refinement, which process is required in a conventional case where a refining material and a refined material are in the same state (gas and gas, or liquid and liquid). This allows very easily obtaining refined hydrogen iodide, compared with a conventional hydrogen iodide refining unit.

That is, with the arrangement, merely causing crude hydrogen iodide gas to contact with a refining solution allows producing hydrogen iodide with high purity while hardly losing hydrogen iodide in the crude hydrogen iodide gas.

"Hydrogen iodide with high purity" indicates hydrogen iodide which hardly contains: a byproduct produced in a reaction for producing crude hydrogen iodide gas; and a material having an adverse effect on a further reaction process using hydrogen iodide obtained in a hydrogen iodide refining step.

It is preferable to arrange the system of the present invention so as to further include: a raw material adjusting unit including an iodine reservoir tank for reservoiring liquid iodine obtained by melting solid iodine and a hydrogen supplier for supplying hydrogen-containing gas, the raw material adjusting unit supplying the hydrogen-containing gas from the hydrogen supplier to at least one of the liquid iodine reservoired in the iodine reservoir tank and gaseous iodine obtained by evaporating the liquid iodine so as to obtain a mixture gas including gaseous iodine and hydrogen; a hydrogen iodide producing unit including a hydrogen iodide producer having a catalyst section made of a catalyst which converts the mixture gas obtained in the raw material adjusting unit into crude hydrogen iodide gas; and an iodine compound producing unit including an iodine compound producer for causing the hydrogen iodide gas obtained in the hydrogen iodide refining unit to contact with a reaction material reactive to the hydrogen iodide gas so as to produce an iodine compound.

With the arrangement, it is possible to produce hydrogen iodide by a gas phase catalytic reduction reaction using gaseous iodine and hydrogen. Use of a gas phase reaction in synthesis of hydrogen iodide allows preventing production of byproducts in a liquid phase reaction, allowing easy and efficient production of hydrogen iodide.

Further, with the arrangement, it is possible to almost completely prevent production of byproducts in a production reaction of crude hydrogen iodide gas. Consequently, it is unnecessary to carry out a process of removing byproducts in refinement of crude hydrogen iodide gas. That is, it is possible to obtain hydrogen iodide with high purity by merely removing unreacted iodine (or unreacted hydrogen) in a gas phase catalytic reduction reaction.

Further, by producing an iodine compound by using the hydrogen iodide with high purity obtained as a result of the above arrangement, it is possible to easily and efficiently produce an iodine compound. Further, since it is possible to reduce the cost for producing hydrogen iodide, it is possible to keep down the prices for hydrogen iodide and an iodine compound produced from the hydrogen iodide.

Further, it is possible to easily realize a desirable molar ratio of hydrogen to gaseous iodine in a gas phase catalytic reduction reaction when supplying hydrogen to gaseous iodine. This also allows synthesizing hydrogen iodide while hardly producing an unreacted material in a gas phase catalytic reduction reaction.

Further, it is preferable to arrange the system of the present invention such that the iodine reservoir tank includes a heater for heating the iodine reservoir tank.

With the arrangement, it is possible to produce liquid iodine from solid iodine.

Further, by heating the iodine reservoir tank so that temperature thereof is in a range from a melting point (approximately 114° C.) to 150° C., it is possible to keep iodine in a liquid state without gasifying iodine. This allows gasifying iodine in an amount according to the temperature of iodine and to an amount of gas to be contacted with, allowing easily obtaining gaseous iodine in a desired amount.

Further, it is preferable to arrange the system of the present invention such that the hydrogen iodide producing unit further includes a catalyst heater for heating the catalyst section.

With the arrangement, it is possible to keep the temperature of a mixture gas in the hydrogen iodide producer in the hydrogen iodide producing unit at a desired temperature. This activates hydrogen and gaseous iodine and prevents the produced crude hydrogen iodide gas from not sufficiently desorbing from the surface of the catalyst. Further, it is also possible to prevent the decrease in yield of crude hydrogen iodide gas due to the decrease in a conversion ratio of iodine and prevent the decrease in catalytic activity.

Further, it is preferable to arrange the system of the present invention such that the hydrogen iodide refining unit includes a circulating mechanism for circulating a refining solution for removing unreacted iodine from the crude hydrogen iodide gas, and the circulating mechanism includes a cooler for cooling the refining solution when the refining solution is returned to the refining device.

With the arrangement, it is possible to further reduce water in the refined hydrogen iodide. That is, it is possible to obtain hydrogen iodide with further higher purity.

Further, it is preferable to arrange the system of the present invention such that the iodine compound producer is provided with a flow path via which a solution of the reaction material flows and is connected with a gas nozzle via which the hydrogen iodide gas is introduced into the flow path.

With the arrangement, it is possible to produce an iodine compound efficiently and with high productivity.

Further, it is preferable to arrange the system of the present invention such that the raw material adjusting unit further includes a gas mixer for making even composition between the gaseous iodine and the hydrogen in the mixture gas.

With the arrangement, it is possible to make even composition between the gaseous iodine and the hydrogen in the mixture gas in the raw material adjusting unit, so that the mixture gas with even composition can be supplied to the hydrogen iodide producer. This allows synthesis of hydrogen iodide in the hydrogen iodide producing unit to proceed at a desirable pace.

Further, it is preferable to arrange the system of the present invention such that the raw material adjusting unit further includes a mixture gas heater for heating the mixture gas.

With the arrangement, it is possible to set the temperature of the mixture gas to be a temperature suitable for a reaction in the hydrogen iodide producing unit, before the reaction starts. This allows synthesis of hydrogen iodide to start at the most desirable temperature when the mixture gas reaches the catalyst layer in the hydrogen iodide producing tower.

Further, it is preferable to arrange the system of the present invention such that the mixing gas heater is integrated with the gas mixer.

With the arrangement, it is possible to make even composition between gaseous iodine and hydrogen in the mixture gas in the gas mixer while heating the mixture gas to have a temperature suitable for the reaction in the hydrogen iodide producer.

Further, since it is unnecessary to provide the gas mixer and the mixture gas heater separately, it is possible to make the system of the present invention downsized and lightweighted.

Further, it is preferable to arrange the system of the present invention such that the mixture gas heater and the gas mixer are integrated with the hydrogen iodide producer.

With the arrangement, it is possible to supply the mixture gas to the catalyst layer in the hydrogen iodide producing tower without changing the temperature of the mixture gas having been heated to a temperature suitable for the reaction in the hydrogen iodide producing unit.

Further, since it is unnecessary to provide the gas mixer and the mixture gas heater separately from the hydrogen iodide producer, it is possible to make the system of the present invention downsized and light-weighted.

It is preferable to arrange the system of the present invention such that the raw material adjusting unit is made of at least one material selected from the group consisting of Hastelloy, glass, ceramics, metal tantalum, platinum, and polytetrafluoroethylene.

It is preferable to arrange the system of the present invention such that the hydrogen iodide producing unit is made of at least one material selected from the group consisting of Hastelloy, heat-resistant glass, ceramics, and platinum.

Further, it is preferable to arrange the system of the present invention such that each of the hydrogen iodide refining unit and the iodine compound producing unit is made of at least one material selected from the group consisting of Hastelloy, glass, ceramics, metal tantalum, platinum, polyvinyl chloride, and polytetrafluoroethylene.

When the raw material adjusting unit, the hydrogen iodide producing unit, the hydrogen iodide refining unit, and the iodine compound producing unit are made of the above materials, it is possible to prevent the units from being eroded by erosive iodine and hydrogen iodide. This allows the system of the present invention to have a longer life.

Further, when the hydrogen iodide producing unit is made of the above material, it is possible to prevent the unit from being impaired by the mixture gas and the crude hydrogen iodide gas having heated up to approximately 350° C. This allows the system of the present invention to have a further longer life.

It is preferable to arrange the system of the present invention such that the refining device in the hydrogen iodide refining unit includes a filling tower filled with filler, and the filling tower is provided with an entrance via which the crude hydrogen iodide gas and a refining solution for removing unreacted iodine from the crude hydrogen iodide gas are introduced.

With the arrangement, unreacted iodine in the crude hydrogen iodide gas is absorbed by a saturated hydrogen iodide solution. This allows very efficiently obtaining hydrogen iodide with high purity without a troublesome process.

Further, it is preferable to arrange the system of the present invention such that the refining device in the hydrogen iodide refining unit includes a refining tank for reservoiring a refining solution for removing unreacted iodine from the crude hydrogen iodide gas and a supplier for supplying the crude hydrogen iodide gas to the refining tank.

With the arrangement, unreacted iodine in the crude hydrogen iodide gas is absorbed by a saturated hydrogen iodide solution. This allows very efficiently obtaining hydrogen iodide with high purity without a troublesome process.

In order to solve the foregoing problem, a method of the present invention for producing an iodine compound by using hydrogen iodide gas includes a hydrogen iodide refining step of causing crude hydrogen iodide gas to contact with a refining solution so as to obtain hydrogen iodide gas, the crude hydrogen iodide gas being produced by causing hydrogen gas to contact with gaseous iodine in a presence of a catalyst, the refining solution dissolving a material other than hydrogen iodide and not dissolving hydrogen iodide in the crude hydrogen iodide gas.

With the arrangement, the method of the present invention yields effects similar to those yielded by the system of the present invention.

Further, it is preferable to arrange the method of the present invention such that the refining solution in the hydrogen iodide refining step is a saturated hydrogen iodide solution.

With the arrangement, it is possible to effectively remove unreacted iodine in the crude hydrogen iodide gas. This allows very easily removing iodine included in hydrogen iodide.

Further, it is preferable to arrange the method of the present invention such that a solvent for the saturated hydrogen iodide solution is at least one selected from the group consisting of water, ketones, ethers, alcohols, and aromatic compounds.

Further, it is preferable to arrange the method of the present invention such that in the hydrogen iodide refining step, a gas-liquid contact between the crude hydrogen iodide gas and the refining solution is made in a filling tower filled with filler.

Further, it is preferable to arrange the method of the present invention such that in the hydrogen iodide refining step, the gas-liquid contact is made by flowing the crude hydrogen iodide gas into the refining solution.

With the arrangement, it is possible to refine hydrogen iodide from hydrogen iodide-containing gas with a very easy process without any expensive equipment.

Further, it is preferable to arrange the method of the present invention such that the catalyst is at least one platinum group metal dispersedly supported on at least one of oxide and active carbon.

With the arrangement, it is possible to activate iodine and hydrogen. This allows increasing the speed of producing hydrogen iodide even at a relatively low reaction temperature. Further, with the arrangement, it is also possible to increase the conversion ratio of iodine and the yield of produced hydrogen iodide.

It is preferable to arrange the method of the present invention so as to further include a gaseous iodine producing step of causing liquid iodine obtained by heating solid iodine to contact with gas containing at least one of gas inert to the liquid iodine and hydrogen so as to obtain gaseous iodine, a hydrogen iodide producing step of subjecting a mixture gas containing the gaseous iodine and hydrogen to a catalytic reduction in a presence of the catalyst so as to produce crude hydrogen iodide gas, and an iodine compound producing step of producing an iodine compound by using the hydrogen iodide gas obtained in the hydrogen iodide refining step.

With the arrangement, the method of the present invention yields effects similar to those yielded by the system of the present invention.

Further, with the arrangement, crude hydrogen iodide produced in the hydrogen iodide producing step is in a gaseous form. Accordingly, it is unnecessary to carry out a process of heating and distilling a hydrogen iodide-containing solution whose main component is hydrogen iodide in order to produce crude hydrogen iodide gas. Consequently, it is possible to more easily obtain hydrogen iodide with high purity.

Further, it is preferable to arrange the method of the present invention such that a molar ratio of hydrogen to gaseous iodine in the mixture gas is set in a range from 0.5 to 10 before the hydrogen iodide producing step.

By setting a molar ratio of hydrogen to gaseous iodine in the mixture gas to be in the above range, it is possible to make hydrogenation of iodine proceed smoothly.

When the molar ratio is less than 0.5, the amount of hydrogen gas with respect to iodine gas is small. This drops productivity of hydrogen iodide and necessitates a process of recovering expensive iodine. On the other hand, when the molar ratio is more than 10, excessive hydrogen is used. This raises the cost of producing hydrogen iodide, which is disadvantageous.

Further, it is preferable to arrange the method of the present invention such that in the iodine compound producing step, the hydrogen iodide gas is caused to contact with an inorganic base compound solution.

With the arrangement, a gas-liquid contact between the hydrogen iodide gas and the inorganic base compound solution is carried out. This increases an efficiency of contact between the reaction materials. This increases productivity of inorganic iodide.

Further, it is preferable to arrange the method of the present invention so as to further include a drying step of drying an inorganic iodide solution obtained in the iodine compound producing step.

With the arrangement, it is possible to produce solid inorganic iodide.

Further, it is preferable to arrange the method of the present invention such that in the iodine compound producing step, the hydrogen iodide gas or a solution in which the hydrogen iodide gas is dissolved is caused to contact with an alcohol-containing solution or an aromatic diazonium solution.

With the arrangement, it is possible to easily and efficiently produce organic iodide merely by causing hydrogen iodide gas or a hydrogen iodide solution to contact with an alcohol-containing solution or an aromatic diazonium solution.

Further, in the case of using hydrogen iodide gas, a gas-liquid contact between hydrogen iodide gas and an alcohol-containing solution or an aromatic diazonium solution is carried out. This increases an efficiency of contact between the reaction materials. This increases productivity of organic iodide.

Further, it is preferable to arrange the method of the present invention so as to further include an organic iodide refining step of refining an organic iodide solution obtained in the iodine compound producing step.

With the arrangement, it is possible to produce organic iodide with high purity.

For a fuller understanding of the nature and advantages of the invention, reference should be made to the ensuing detailed description taken in conjunction with the accompanying drawings.

Further, hydrogen iodide obtained in the hydrogen iodide producing step of the method of the present invention is also encompassed in the present invention.

Further, it is preferable to arrange the hydrogen iodide of the present invention such that a content of iodine in the hydrogen iodide is not more than 2 wt % with respect to 100 wt % of whole components in the hydrogen iodide.

With the arrangement, it is possible to reduce the influence of iodine in the obtained hydrogen iodide with high purity as small as possible when applying the hydrogen iodide to other reaction.

Further, hydriodic acid obtained by dissolving the hydrogen iodide in water is also encompassed in the present invention.

BRIEF DESCRIPTION OF DRAWINGS

FIG. 1 is a block diagram schematically showing a system of the present invention for producing an iodine compound.

REFERENCE SIGNS LIST

1. Raw material adjusting unit
2. Hydrogen-containing gas supplier (hydrogen supplier)
4. Iodine melting pot (iodine reservoir tank)
5. Liquid iodine
8. Mixer section (gas mixer, mixture gas heater)
10. Hydrogen iodide producing unit
12. Hydrogen iodide producing tower (hydrogen iodide producer)
12a. Catalyst layer (catalyst section)
13. Catalyst layer heater (catalyst section heater)
20. Hydrogen iodide refining unit
22. Filling tower (refining device)
24. Tank
30. Iodine compound producing unit
32. Iodine compound producing tower (iodine compound producer)
34. Recovery tank
100. System for producing iodine compound

DESCRIPTION OF EMBODIMENTS

Embodiment 1

The following explains a method for producing an iodine compound in accordance with one embodiment of the present invention.

(Summary of Method for Producing Iodine Compound)

In the present embodiment, the method for producing an iodine compound is explained by instancing a case where the iodine compound is produced using hydrogen iodide produced by a gas phase catalytic reduction reaction of iodine. The method for producing an iodine compound in accordance with the present embodiment mainly includes a gaseous iodine producing step, a hydrogen iodide producing step, a hydrogen iodide refining step, and an iodine compound producing step. The four steps will be explained below individually.

Here, "hydrogen iodide" and "hydrogen" in the present specification etc. indicate gaseous hydrogen iodide and gaseous hydrogen, i.e. hydrogen iodide gas and hydrogen gas, respectively, unless otherwise stated. Further, "crude hydrogen iodide" indicates gas containing not only hydrogen iodide but also unreacted iodine that remains in a reaction of producing hydrogen iodide, iodine produced by decomposition of hydrogen iodide, and impurities that are byproducts produced in the reaction of producing hydrogen iodide. Further, "iodine" and "hydrogen" indicate iodine molecules ($I_2$) and hydrogen molecules ($H_2$) unless otherwise stated.

(Gaseous Iodine Producing Step)

Initially, the following explains a gaseous iodine producing step. The gaseous iodine producing step is a step of heating solid iodine so as to make at least a part of the solid iodine gaseous.

Iodine is a sublimable material whose melting point is 113.7° C. and whose boiling point is 184.5° C. Therefore, in the gaseous iodine producing step, solid iodine should be heated in such a manner that the temperature of iodine is not less than its melting point and not more than its boiling point. This allows producing gaseous iodine from solid iodine.

However, in a hydrogen iodide reaction step explained below, a molar ratio of hydrogen to gaseous iodine in a mixture gas obtained by mixing gaseous iodine and hydrogen is preferably in a range from 0.5 to 10, and more preferably in a range from 0.5 to 6. When the molar ratio of hydrogen to gaseous iodine is in the above range, it is possible to produce hydrogen iodide with high productivity. That is, when the molar ratio is less than 0.5, the amount of hydrogen gas with respect to iodine gas is small, which reduces consumption of iodine, resulting in low productivity of hydrogen iodide. Further, a step of recovering expensive iodine is required. On the other hand, when the molar ratio is more than 10, hydrogen is used wastefully, resulting in high costs (production costs) for producing hydrogen iodide, which is disadvantageous.

In view of the above, it is preferable that solid iodine is not directly made into gaseous iodine but temporarily made into liquid iodine, and a part of the liquid iodine is made gaseous. Accordingly, the temperature for heating solid iodine is preferably in a range from its melting point (approximately 114° C.) to 150° C. and is more preferably in a range from 120° C. to 150° C.

Further, when producing gaseous iodine from liquid iodine, it is preferable that liquid iodine is caused to contact with hydrogen-containing gas. Liquid iodine produces gaseous iodine in an amount depending on a gas flow rate and a liquid iodine temperature at the time of contact with hydrogen-containing gas. That is, by adjusting the gas flow rate of hydrogen-containing gas to be contacted with and the liquid iodine temperature, it is possible to adjust the amount of iodine gas. At that time, the amount of hydrogen contained in the hydrogen-containing gas to be contacted with liquid iodine is preferably in an amount that allows the molar ratio of hydrogen to gaseous iodine to be the aforementioned predetermined ratio. However, the present embodiment is not limited to this. After changing liquid iodine to gaseous iodine, hydrogen may be further added in order that hydrogen is in the predetermined ratio.

Further, the hydrogen-containing gas may contain gas other than hydrogen as long as the hydrogen-containing gas allows producing a predetermined amount of gaseous iodine. The gas other than hydrogen in the hydrogen-containing gas is preferably inert with respect to iodine. Examples of such gas include nitrogen, argon, and helium.

It is preferable that the mixture gas made by mixing gaseous iodine with hydrogen is evenly mixed before the hydrogen iodide producing step. Further, in a case of producing gaseous iodine, if the amount of hydrogen in hydrogen-containing gas is not in an amount that allows hydrogen to be in the desired molar ratio, it is preferable to cause the molar ratio of hydrogen to gaseous iodine to be the predetermined molar ratio before evenly mixing the mixture gas. An arrangement of evenly mixing the mixture gas will be detailed in Example 2 and therefore an explanation thereof is omitted here.

The purity of solid iodine to be used is preferably not less than 90%, more preferably not less than 95%, and further more preferably not less than 99%.

Examples of hydrogen used here include pure hydrogen, hydrogen-containing gas obtained by reforming methane with at least one of water vapor and carbon dioxide, hydrogen separated from the hydrogen-containing gas, hydrogen-containing gas obtained by a partial oxidization reaction of methane, hydrogen-containing gas obtained by steam-reforming methanol, and hydrogen-containing gas obtained by dissolving methanol. Further, hydrogen obtained by a gasification process from coal, petroleum coke, and heavy residual oil may be used as a hydrogen source. Further, hydrogen obtained by separating and recovering unreacted hydrogen contained in gas at the exit of a hydrogen iodide producing tower may be recycled.

[Hydrogen Iodide Producing Step]

The following explains the hydrogen iodide producing step. The hydrogen iodide producing step is a step of producing crude hydrogen iodide gas containing hydrogen iodide as a main component, the crude hydrogen iodide gas being obtained by a gas phase catalytic reduction of iodine. Note that "main component" in the present specification etc. indicates that the component is not less than 50 wt % with respect to the whole components contained in crude hydrogen iodide gas or hydrogen iodide.

The hydrogen iodide producing step may be carried out by a conventional and publicly known method. For example, crude hydrogen iodide gas can be produced by a gas phase catalytic reduction of gaseous iodine and hydrogen in the presence of a catalyst.

As described above, in the case of producing hydrogen iodide-containing gas by a gas phase catalytic reduction reaction using gaseous iodine and hydrogen gas in the presence of a catalyst, crude hydrogen iodide gas includes almost no substance other than iodine and hydrogen that remain without reacting in the gas phase catalytic reduction reaction, in particular, includes almost no byproduct. That is, by obtaining crude hydrogen iodide gas by the gas phase catalytic reduction reaction using gaseous iodine and hydrogen, it is possible to omit a process of heating and distilling a hydrogen iodide-containing solution, which process is required in a liquid phase reaction. This allows easily obtaining hydrogen iodide with high purity.

Hydrogen does not have an effect on a subsequent reaction step such as a step of producing inorganic iodide. Accordingly, it is unnecessary to separately provide a process of separating hydrogen. However, if an experimenter want to remove hydrogen from crude hydrogen iodide gas, it is preferable that iodine is removed from crude hydrogen iodide gas and then hydrogen iodide gas is cooled down and liquidized. This allows easily removing hydrogen contained in crude hydrogen iodide gas.

[Catalyst in Hydrogen Iodide Producing Step]

It is preferable that a catalyst in the gas phase catalytic reduction reaction using gaseous iodine and hydrogen gas is a catalyst which is a platinum group element dispersedly supported on at least one of oxide and active carbon. By dispersedly supporting a platinum group element on at least one of oxide and active carbon, it is possible to activate iodine and hydrogen. This allows increasing the speed of producing hydrogen iodide at a relatively low temperature. Further, it is also possible to increase a conversion rate of iodine and a yield of hydrogen iodide.

Examples of the platinum group element include platinum (Pt), palladium (Pd), ruthenium (Ru), osmium (Os), iridium (Ir), and rhodium (Rh). Specific examples of the oxide include magnesium oxide, titanium oxide, silica, alumina, cordierite, zirconia, silica alumina, and zeolite. Specific examples of the active carbon include: botanical active carbon obtained by activating a material such as chippings, wood flour, palm shells and nut shells; mineral active carbon obtained by activating peat, coal cokes, and tar; and active carbon obtained by activating raw materials such as natural materials such as regenerated fiber and rayon and synthetic materials such as phenol resin and acrylic resin.

The shape of the catalyst (i.e. the shape of a support that dispersedly supports a platinum group element) is not particularly limited. For example, the support may be in a powder form, or may be molded in a ring shape, a sphere shape, or a honeycomb shape beforehand and then caused to support the platinum group element, or may be caused to support the platinum group element and then molded in a ring shape, a sphere shape, or a honeycomb shape. Further, a powder which is a platinum group element supported on oxide powder may be supported by silicon carbide (SiC) or nitride which is in ring shape, spherical shape, or honeycomb shape.

Further, the platinum group element used as the catalyst may be used alone or two or more of such elements may be used in combination. The oxide used as the support for the platinum group element may be used alone or two or more of such elements may be used in combination. The same is true for the active carbon used as the support for the platinum group metal. Further, one of the oxide and the active carbon may be used or both of the oxide and the active carbon may be used.

[Conditions for Hydrogen Iodide Producing Step]

A reaction temperature for the gas phase catalytic reduction reaction is preferably in a range from 200 to 1000° C., more preferably in a range from 250 to 900° C., and further more preferably from 250 to 850° C. Further, gas hourly space velocity is preferably in a range from 300 to 10000 $hr^{-1}$, and more preferably in a range from 500 to 4000 $hr^{-1}$. "gas hourly space velocity" in the present specification etc. indicates a ratio of a reactive gas volume to a catalyst volume per unit time in a normal state. Further, a reaction pressure is preferably in a range from a normal pressure to 10 MPa.

As for detailed conditions for producing crude hydrogen iodide gas by the gas phase catalytic reduction reaction, the whole contents of Patent Literature 8 may be referred to.

[Hydrogen Iodide Refining Step]

The following explains the hydrogen iodide refining step. The hydrogen iodide refining step is a step of removing a material other than hydrogen iodide (the material is hereinafter also referred to as impurity) in the crude hydrogen iodide gas containing hydrogen iodide as a main component, the crude hydrogen iodide gas being produced in the hydrogen iodide producing step. That is, the hydrogen iodide refining step is a step of carrying out a gas-liquid contact between: a refining solution which dissolves an impurity contained in the crude hydrogen iodide gas but does not dissolve hydrogen iodide; and the crude hydrogen iodide gas.

By carrying out the hydrogen iodide refining step, it is possible to very easily remove the impurity contained in the crude hydrogen iodide gas while hardly impairing hydrogen iodide synthesized in the hydrogen iodide producing step.

Further, since the hydrogen iodide refining step carries out a gas-liquid contact between the crude hydrogen iodide gas in a gaseous state and the refining solution in a liquid state, it is unnecessary to carry out a separation process in which a material used for refinement is separated after the refinement, unlike a conventional case where refinement is made between materials in the same states, i.e. between liquids. That is, it is possible to efficiently and very easily refine only hydrogen iodide from the crude hydrogen iodide gas containing the impurity so as to obtain hydrogen iodide with high purity.

The hydrogen iodide refining step is carried out in such a manner that the content of iodine contained in the refined hydrogen iodide is preferably 2 wt % or less, more preferably 1 wt % or less, further more preferably 0.5 wt % or less, and most preferably 0.1 wt % or less with respect to 100 wt % of the whole contents of hydrogen iodide.

In other words, the hydrogen iodide with high purity thus obtained is composed in such a manner that the weight of iodide is 2 wt % or less, more preferably 1 wt % or less, further more preferably 0.5 wt % or less, and most preferably 0.1 wt % or less with respect to 100 wt % of the whole components of hydrogen iodide. When hydrogen iodide gas with high purity obtained in the hydrogen iodide refining step is absorbed in water, hydrogen iodide with any concentration and high purity can be obtained, and when the hydrogen iodide gas is cooled down, liquid hydrogen iodide with high purity can be obtained.

When unreacted iodine contained in hydrogen iodide gas is in the above range, it is possible to cause the influence of iodine in the obtained hydrogen iodide with high purity to be as small as possible in applying the obtained hydrogen iodide with high purity to other reaction such as the iodine compound producing step explained below.

It should be noted that inert gas such as hydrogen and nitrogen is not included in the material other than hydrogen iodide in crude hydrogen iodide gas. Accordingly, "the whole components" of hydrogen iodide indicate the whole components other than inert gas such as hydrogen and nitrogen of hydrogen iodide. Further, "hydrogen iodide with high purity" in the specification etc. indicates that the weight of iodine is in the above range with respect to 100 wt % of "the whole components" of hydrogen iodide. In other words, "hydrogen iodide with high purity" indicates that the weight of the "impurity" is in the above range with respect to 100 wt % of "the whole components" of hydrogen iodide.

[Refining Solution]

The refining solution is not particularly limited as long as the refining solution dissolves the impurity contained in crude hydrogen iodide gas but does not dissolve hydrogen iodide. In particular, the refining solution is preferably a solution capable of removing unreacted iodine which is difficult to be separated from hydrogen iodide and which becomes an obstacle when applying the produced hydrogen iodide to other reaction.

An example of the refining solution having the above property is a saturated hydrogen iodide solution. The saturated hydrogen iodide solution is a solution which dissolves iodine very well but dissolves almost no hydrogen iodide since hydrogen iodide is saturated in the solution. In the present embodiment, an explanation is made as to a case where the refining solution is the saturated hydrogen iodide solution.

The saturated hydrogen iodide solution can be prepared by dissolving hydrogen iodide in a solvent until hydrogen iodide is saturated. The solvent used for preparing the saturated hydrogen iodide solution is not particularly limited as long as the solvent is capable of dissolving hydrogen iodide. Examples of the solvent include water, ketones, halogen compounds, aromatic compounds, ethers, and alcohols. Further, the solvent may be an aqueous solution containing alkaline metal iodide or an aqueous solution containing alkaline earth metal iodide. More specific examples of the solvent include distilled water, acetone, chloroform, carbon tetrachloride, benzene, toluene, xylene, petroleum ether, dioxane, ethylether, methanol, a potassium iodide aqueous solution, and a barium iodide aqueous solution. Among them, the aqueous solution is preferably water, an aqueous solution containing alkaline metal iodide, or ketones and aromatic compounds, and more preferably water since water can be obtained easily and inexpensively.

The temperature of the saturated hydrogen iodide solution is not required to be controlled strictly. This is because whereas dissolve of hydrogen iodide in a saturated solution essentially involves generation of heat due to heat of dissolution, a gas-liquid contact between crude hydrogen iodide gas and a saturated hydrogen iodide solution in the hydrogen iodide refining step of the present invention does not involve dissolve of hydrogen iodide.

In this regard, the present invention allows omitting a troublesome process of controlling the temperature of a solution used in the hydrogen iodide refining step, allowing very easily obtaining hydrogen iodide with high purity. However, when there is a request to reduce water in refined hydrogen iodide as small as possible because of its application to a semiconductor manufacture etc., it is preferable to make the temperature of a saturated hydrogen iodide solution as low as possible. Specifically, the temperature of a saturated hydrogen iodide solution is preferably not more than 100° C., more preferably not more than 50° C., and most preferably not more than 20° C.

Further, a part of hydrogen iodide refined in the hydrogen iodide refining step may be used as a solute of a saturated hydrogen iodide solution.

[Iodine Compound Producing Step]

The following explains the iodine compound producing step. The iodine compound producing step is a step of producing iodine compounds using hydrogen iodide gas with high purity obtained in the hydrogen iodide refining step. In the present embodiment, explanations are made as to cases where inorganic iodide, aliphatic iodide, and aromatic iodide are produced. It should be noted that application of hydrogen iodide obtained through the above steps is not limited to production of the iodine compound. The hydrogen iodide is also preferably applicable to other reaction using hydrogen iodide as a raw material.

Hydrogen iodide gas used in the iodine compound producing step according to the present invention is gas containing hydrogen iodide gas. That is, hydrogen iodide gas used in the iodine compound producing step is not limited to pure hydrogen iodide gas. The content of iodine in hydrogen iodide gas is preferably not more than 2 wt % with respect to the whole weight of hydrogen iodide gas. When iodine in hydrogen iodide gas is in the above range, it is possible to produce an iodine compound with high purity without carrying out a refining process and a reduction process for removing unreacted iodine molecules after producing an iodine compound.

Further, in the present embodiment, it is preferable to configure hydrogen iodide gas such that the content of an impurity is not more than 2 wt % with respect to 100 wt % of hydrogen iodide gas. That is, in the present embodiment, hydrogen iodide gas with high purity is hydrogen iodide gas whose content of an impurity is not more than 2 wt % with respect to 100 wt % of hydrogen iodide gas.

[Production of Inorganic Iodide]

Initially, the following explains production of inorganic iodide. Inorganic iodide can be produced by contact between hydrogen iodide and an inorganic base compound. The inorganic base compound used in the present embodiment is a compound capable of making a neutralization reaction with hydrogen iodide. In other words, the inorganic base compound used in the present embodiment is a compound which makes a dissociative reaction or a static reaction in an aqueous solution to produce hydroxide ions (OH—).

Specific examples of such inorganic base compound include: metal hydroxides, e.g. alkaline metal, alkaline earth metal, rare earth element, transition metal, and hydroxides of typical elements such as aluminum and zinc; metal base oxides; metal carbonates such as alkaline metal carbonates; metal hydrogen carbonates such as alkaline metal hydrogen carbonates; and ammonia. Among them, the inorganic base compound is preferably alkaline metal hydroxides, alkaline earth metal hydroxides, or ammonia in terms of low cost and availability.

The inorganic base compound is used in the reaction while it is in a solid state, an aqueous solution state where it is completely dissolved in a solvent such as water, or a slurry state where it is dispersed in water. Among them, it is preferable to use the inorganic base compound in the reaction while the inorganic base compound is in the aqueous solution state where it is dissolved in water. In this regard, a detailed explanation will be made in the later description of the reaction.

[Production of Inorganic Iodide]

Inorganic iodide according to the present embodiment is produced by a neutralization reaction in which hydrogen iodide gas and an inorganic base compound contact with each other. For example, in a case where the inorganic base compound is potassium hydroxide, the reaction is made according to reaction formula (1) below.

$$HI + KOH \rightarrow KI + H_2O \quad (1)$$

When producing inorganic iodide, it is preferable that a contact between hydrogen iodide gas and an inorganic base compound is carried out in the form of a gas-liquid contact using a liquid inorganic base compound (hereinafter also referred to as "inorganic base solution"). The gas-liquid contact allows higher contact efficiency and higher productivity than a gas-solid contact.

In general, concentration of inorganic iodide used in a solution is preferably in a range from 1 to 95 wt %, more preferably in a range from 5 to 90 wt %, and further more preferably in a range from 10 to 80 wt %, although the concentration depends also on solubility of a solute in a solvent. When the concentration of the inorganic iodide solution is in the above range, it is possible to reduce the costs for raw materials and to reduce energy required for separating and recovering inorganic iodide from a reaction solution. Consequently, it is possible to reduce the costs for producing inorganic oxide. The solvent is preferably water and alcohols, and more preferably water.

The gas-liquid contact may be carried out by a conventional and publicly known method. For example, a gas-liquid contact between hydrogen iodide gas and an inorganic base solution may be carried out in a reaction tower filled with filler, or a gas-liquid contact may be carried out by introducing hydrogen iodide gas into a reservoir tank in which an inorganic base solution is reservoired.

Further, the gas-solid contact may be carried out by introducing hydrogen iodide gas into a glass tube filled with particulate inorganic hydroxide so that they react with each other.

A reaction temperature of the reaction for producing inorganic iodide is not particularly limited as long as the temperature allows the reaction to proceed. Here, it is preferable to control pH value of a reaction system to be in a range from 1.50 to 11.00 after completion of the reaction for producing inorganic iodide. That is, in the case of the gas-liquid contact, it is preferable that final pH value of a reaction liquid is in the above range. When pH at completion of the reaction is less than 1.50, a product is likely to contain iodine or hydrogen iodide, making it difficult to obtain inorganic iodide with high quality. When pH at completion of the reaction is more than 11.00, a product is likely to contain iodate, making it difficult to obtain inorganic iodide with high quality.

pH value of the reaction system can be controlled by suitably adding an acidic compound or an alkaline compound to the reaction system according to the measured pH value. For example, when pH value is less than 1.50, an inorganic base solution should be added. When pH is more than 11.00, hydrogen iodide or organic acid should be added.

The organic acid to be added is preferably a reductive acid. Examples of such acid include formic acid, hydrazine, sulfurous acid, and phosphorous acid. As described above, by adjusting pH using a reductive acid, it is possible to stabilize potassium iodide. Further, in the case of using a reductive acid, this acid not only adjusts pH but also removes unreacted iodine and prevents isolation of iodine due to decomposition of inorganic iodide.

After completion of the reaction, a reduction process for removing unreacted iodine molecules may be carried out if necessary. The reduction process may be a conventional and publicly known reduction process such as addition of a reducer such as formic acid and oxalic acid.

As described above, contacting hydrogen iodide gas with an inorganic base compound allows easily and efficiently producing inorganic iodide with high purity. In particular, use of hydrogen iodide gas with high purity allows producing inorganic iodide with high purity without other refining step after obtainment of inorganic iodide.

In the case of producing inorganic iodide as an inorganic iodide solution by a gas-liquid contact, use of a drying step of distilling and removing a solvent and drying crystals of inorganic iodide allows obtaining the inorganic iodide as a solid. The drying step may be a conventional and publicly known drying step. In particular, use of vacuum concentration drying by an evaporator or freeze-drying allows obtaining solid inorganic iodide in a short time.

[Production of Aliphatic Iodide]

The following explains production of aliphatic iodide. Aliphatic iodide in the present specification etc. indicates alkyl iodide. That is, target aliphatic iodide can be obtained by contacting hydrogen iodide gas with an alcohol-containing solution. Production of aliphatic iodide is carried out substantially similar manner to production of inorganic iodide explained above.

For example, when the alcohol-containing solution is methanol, a reaction is carried out according to reaction formula (2) below.

$$HI + CH_3OH \rightarrow CH_3I + H_2O \quad (2)$$

Therefore, as for production of aliphatic iodide, explanations common between production of inorganic iodide and production of aliphatic iodide are omitted here, and only differences between production of inorganic iodide and production of aliphatic iodide will be explained below.

In production of aliphatic iodide, an alcohol-containing solution to contact with hydrogen iodide gas is preferably alcohol having 1 to 8 or so carbon atoms, and more preferably alcohol having 1 to 6 or so carbon atoms. Further, alcohol preferably used in production of aliphatic iodide may have a straight chain or a branched chain. Further, preferably used alcohol is not limited to univalent alcohol, and may be multivalent alcohol. Among them, specific examples of more preferably usable alcohol solutions include methanol, ethanol, and isopropanol.

Further, the alcohol solution is not limited to pure alcohol. That is, the alcohol solution may contain water or an organic solvent other than alcohol for example. An alcohol solution whose content of alcohol is 50% or more can be preferably used in production of aliphatic iodide.

In production of aliphatic iodide, a solution in which hydrogen iodide gas is dissolved as a solute (hydrogen iodide solution) may be used instead of hydrogen iodide gas. An example of the hydrogen iodide solution is hydriodic acid obtained by dissolving hydrogen iodide in water.

In the case of using the hydrogen iodide solution in the iodine compound producing step, the hydrogen iodide refining step is carried out in such a manner that the content of iodine contained in the resulting hydrogen iodide is preferably 2 wt % or less, more preferably 1 wt % or less, further more preferably 0.8 wt % or less, and most preferably 0.5 wt % or less with respect to 100 wt % of the whole components of the hydrogen iodide solution.

When the amount of iodine contained in hydrogen iodide is in the above range, it is possible to make the influence of iodine in the hydrogen iodide solution as small as possible in applying the obtained hydrogen iodide solution to other reaction.

Further, by subjecting the aliphatic iodide solution thus produced to a refining step, it is possible to obtain aliphatic iodide in the form of a liquid or solid with high purity. The refining step used here may be a conventional and publicly known step such as distillation.

[Production of Aromatic Iodide]

The following explains production of aromatic iodide. A target aromatic iodide can be obtained by contacting hydrogen iodide gas with an aromatic diazonium solution. That is, a diazonium group binding to an aromatic ring is replaced with iodine to produce aromatic iodide. Production of aromatic iodide is made in substantially the same manner as production of inorganic iodide as explained above. Accordingly, production of aromatic iodide is not explained here except for processes of production of aromatic iodide which are different from those of production of inorganic iodide explained above.

An aromatic diazonium solution preferably applicable to production of aromatic iodide is not particularly limited as long as the aromatic diazonium solution contains a diazonium group (N≡N+−) in its side chain, and may contain a substituent other than the diazonium group. Specifically, the aromatic diazonium solution may be a compound represented by formula (1) below.

[Chemical formula 1]

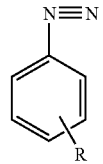

(1)

R in the formula (1) is one selected from the group consisting of an alkyl group having 1-12 carbon atoms, an alkenyl group, and a hydroxyl group, an alkoxy group having 1-8 carbon atoms, an acyloxy group having 1 to 6 carbon atoms, a carboxyl group, an alkoxycarboxyl group, an alkoxycarbonylalkyl group, an amino group, an acylamino group, a carbamoyl group, a carbonyl group, a nitrile group, a nitro group, and a halogen atom.

The alkyl group more preferably has 1-8 carbon atoms, and further more preferably has 1-6 carbon atoms. Further, the alkyl group may have straight chains or may have branched chains. Alternatively, the alkyl group may be ring-shaped. Specific examples of the alkyl group include a methyl group, an ethyl group, a propyl group, an isopropyl group, a butyl group, an isobutyl group, a s-butyl group, a t-butyl group, a pentyl group, a hexyl group, a heptyl group, and an octyl group. Further, the alkoxy group more preferably has 1-6 carbon atoms, and further more preferably has 1-4 carbon atoms. Specific examples of the alkoxy group include a methoxy group and an ethoxy group.

Among aromatic diazonium containing the above substituent, one of an alkyl group having 1-4 carbon atoms chain, a carboxyl group, and a halogen atom is preferably used.

Formula (1) above indicates a case where the aromatic diazonium is a disubstituent containing one substituent other than the diazonium group. However, the present invention is not limited to this case. The aromatic diazonium may contain three or more substituents consisting of the diazonium group, the substituent represented by R in Formula (1), and one or more other substituents.

In this case, examples of the additional substituent include: an alkenyl group such as a vinyl group, a 1-propenyl group, an allyl group, and a butenyl group; alkyl carbonyl group having 1-6 carbon atoms such as formyl group, acetyl group, and propionyl group; an acyl group such as allyl-carbonyl group including benzoyl group; acyloxy group having 1-6 carbon atoms such as formyloxy group, acetyloxy group, and propionyloxy group; an amino group including a mono- or dialkyl amino group such as a methyl amino group, a dimethyl amino group, and a diethyl amino group; an acyl amino group having 1-6 carbon atoms such as a formyl amino group and an acetyl amino group; a carbamoyl group; a substituted carbamoyl group; carbonyl group; and nitrile group.

In production of aromatic iodide as well as in production of aliphatic iodide, a hydrogen iodide solution may be used instead of hydrogen iodide gas.

Further, "organic iodide" in the present specification etc. is a general term for iodide including aliphatic iodide and aromatic iodide.

Embodiment 2

The following explains a system of the present invention for producing an iodine compound in accordance with Embodiment 2 with reference to FIG. 1. FIG. 1 is a block diagram schematically showing the system of the present invention for producing an iodine compound. Therefore, FIG. 1 does not accurately show the shapes of lines connecting units and the sizes of the units in the system for producing an iodine compound. The shapes of the lines and the sizes of the units may be appropriately varied in production of an apparatus. Note that terms of the present embodiment that are the same as those of Embodiment 1 are used with the same meanings unless otherwise stated.

As shown in FIG. 1, a system 100 of the present invention for producing an iodine compound mainly includes four units: a raw material adjusting unit 1, a hydrogen iodide producing unit 10, a hydrogen iodide refining unit 20, and an iodine compound producing unit 30. The raw material adjusting unit 1 is physically connected with the hydrogen iodide producing unit 10, the hydrogen iodide producing unit 10 is physically connected with the hydrogen iodide refining unit 20, and the hydrogen iodide refining unit 20 is physically connected with the iodine compound producing unit 30, via lines. Individual units are explained below.

[Raw Material Adjusting Unit 1]

The raw material adjusting unit 1 is a unit for adjusting a raw material from which hydrogen iodide for producing an iodine compound is produced. More specifically, the raw material adjusting unit 1 is a unit for adjusting gaseous iodine and hydrogen to have predetermined molar ratios and predetermined temperatures.

As shown in FIG. 1, the raw material adjusting unit 1 includes a hydrogen-containing gas supplier (hydrogen supplier) 2, an iodine melting pot (gaseous iodine producer) 4, and a mixer section (gas mixer, mixture gas heater) 8. The hydrogen-containing gas supplier 2 reserves hydrogen used for synthesizing hydrogen iodide. As explained in Embodiment 1, when using inert gas for production of gaseous iodine, it is preferable that there is provided not only the hydrogen-containing gas supplier 2 but also an inert gas reservoir for reserving inert gas to be used.

[Iodine Melting Pot 4]

In the iodine melting pot 4, liquid iodine 5 obtained by heating solid iodine up to not less than a melting point and not more than approximately 150° C. is caused to contact with hydrogen-containing gas supplied from the hydrogen-containing gas supplier 2 via a line 3 so as to produce gaseous iodine. The gaseous iodine thus produced is supplied to the mixer section 8 via a line 6.

The iodine melting pot 4 includes a heater for melting solid iodine to liquid iodine (heater for heating an iodine reservoir tank). Examples of the heater include: a jacket section for flowing a hot medium such as hot air, superheated steam, and oil; an electric heater for externally heating the iodine melting pot 4 filled with solid iodine, and an infrared or far-infrared irradiation equipment for irradiating solid iodine with infrared or far-infrared ray.

Further, the iodine melting pot 4 includes a mechanism for producing gaseous iodine from the liquid iodine 5. The mechanism for producing gaseous iodine is not particularly limited as long as the mechanism allows the liquid iodine 5 to contact with hydrogen-containing gas as explained above.

For example, the mechanism may be a mechanism for blowing hydrogen-containing gas into the iodine melting pot 4, or the mechanism may be such that hydrogen-containing gas is caused to contact with the liquid iodine 5, which is pressured or caused to free-fall by gas (e.g. hydrogen-containing gas or inert gas), to produce gaseous iodine. Alternatively, a pump made of a material which is anticorrosive to iodine may supply a required amount of the liquid iodine 5 so that the supplied iodine is changed to gaseous iodine. In the case of blowing hydrogen-containing gas into the iodine melting pot 4, hydrogen-containing gas may be blown into the liquid iodine 5, or may be blown to contact with the surface of the liquid iodine 5.

Further, the iodine melting pot 4 may have a stirring mechanism, such as a stirring wing, for stirring the liquid iodine 5. Further, the stirring wing may be arranged such that a heat medium such as a heated wind, steam, and oil passes in the stirring wing so that the stirring wing serves as a heat source for melting solid iodine. Alternatively, hydrogen-containing gas to contact with gaseous iodine is heated in advance so that hydrogen-containing gas serves as a heat source for melting solid iodine.

It is preferable that a plurality of the iodine melting pots 4 are positioned in parallel with respect to production lines in order to obtain gaseous iodine continuously and for a long period. Such position allows switching lines according to necessity even when solid iodine runs out in any of the iodine melting pots. This allows continuously supplying gaseous iodine without intermission.

Solid iodine may be changed to the liquid iodine 5 by dissolving the solid iodine in a solvent. Examples of the solvent for dissolving the solid iodine include benzene, methanol, ethanol, and diethylether.

[Mixer Section 8]

The mixer section 8 includes: a gas mixer for mixing the gaseous iodine produced in the iodine melting pot 4 with hydrogen to produce a mixture gas in such a manner that composition of iodine and hydrogen is even; and a heater for heating the mixture gas up to approximately 120-350° C. The mixture gas heated in the mixer section 8 is supplied to the hydrogen iodide producing unit 10 via a line 14.

Specifically, the gas mixer is preferably a filled tube filled with filler. The filler preferably used in the gas mixer is not particularly limited as long as the filler is made of a material anticorrosive to iodine. Specific examples of the filler include Hastelloy, glass, and magnetic ceramics. Further, the shape of the filler is not particularly limited, and may be spherical, column-like (cylindrical), and ring. All fillers to be used may have the same shape or fillers with different shapes may be used in combination.

The heater is not particularly limited as long as the heater can heat the mixture gas up to approximately 120-350° C., preferably approximately 250-350° C. Specifically, a heating wire may be winded around the filling tube to heat the filling tube, or a jacket section for flowing a heated heat medium may be provided.

In the case of producing gaseous iodine in the iodine melting pot 4 using hydrogen-containing gas, if the produced mixture gas does not have a predetermined molar ratio, it is preferable to supply hydrogen from a line 7 so that a molar ratio of hydrogen to gaseous iodine is in a range from 0.5 to 10 before hydrogen and gaseous iodine reach the mixer section 8.

In the present embodiment, an explanation is made as to a case where the mixer section 8 includes the gas mixer and the heater which are integrated with each other. However, the present invention is not limited to this, and the gas mixer and the heater may be provided separately. However, the mixer section 8 including the gas mixer and the heater integrally allows the mixture gas in the gas mixer to have even composition of gaseous iodine and hydrogen, and at the same time to heat the mixture gas up to a temperature suitable for a reaction in the hydrogen iodide production device. Further, the mixer section 8 including the gas mixer and the heater integrally allows the system 100 for producing an iodine compound to be downsized and light-weighted.

[Hydrogen Iodide Producing Unit 10]

The hydrogen iodide producing unit 10 includes a hydrogen iodide producing tower 12 for reacting hydrogen with gaseous iodine. The hydrogen iodide producing tower 12 includes a catalyst layer (catalyst section) 12a therein. hydrogen gas and gaseous iodine are supplied to the lower part of the hydrogen iodide producing tower 12 via a line 14. Crude hydrogen iodide gas is obtained from the upper part of the hydrogen iodide producing tower 12. The obtained crude hydrogen iodide gas is supplied to a hydrogen iodide refining unit 20 via a line 16. The catalyst layer 12a is filled with a catalyst explained in Embodiment 1. Further, the hydrogen iodide producing tower 12 is provided with a catalyst layer heater (catalyst section heater) 13 (such as an electric furnace and oil bath etc.) on its outer surface.

The hydrogen iodide producing unit 10 is not limited to the arrangement where raw materials are supplied to the lower part of the hydrogen iodide producing tower 12 and a resulting product is obtained from the upper part of the hydrogen iodide producing tower 12. Alternatively, the hydrogen iodide producing unit 10 may be arranged such that for example, hydrogen gas and gaseous iodine are supplied to the top of the hydrogen iodide producing tower 12 or that the hydrogen iodide producing tower 12 (catalyst layer 12a in particular) is positioned horizontally and hydrogen gas and gaseous iodine are supplied in a horizontal direction.

The catalyst layer heater 13 can heat an object to be heated so that the temperature of the object is within a range from 100 to 1000° C. However, in general, the catalyst layer heater 13 heats the catalyst layer 12a so that the temperature of the catalyst layer 12a is in a range from 200 to 850° C. By setting the surface temperature of the catalyst layer 12a to be in the range from 200 to 850° C., it is possible to activate gaseous iodine and hydrogen in the mixture gas and to prevent the produced crude hydrogen iodide gas from not sufficiently desorbing from the surface of the catalyst. This allows subduing the drop in yield of hydrogen iodide and the drop in catalyst activity.

Further, the hydrogen iodide producing tower 12 may be integrated with the mixer section 8. That is, the mixer section 8 may be provided before the catalyst layer 12a of the hydrogen iodide producing tower 12. If the hydrogen iodide producing tower 12 is arranged as above, it is possible to supply a mixture gas heated up to a temperature suitable for the reaction in the hydrogen iodide producing tower 12 to the catalyst layer 12a in the hydrogen iodide producing tower 12 while keeping an appropriate temperature of the mixture gas. Further, If the hydrogen iodide producing tower 12 is arranged as above, the system 100 for producing an iodine compound can be downsized and light-weighted.

[Hydrogen Iodide Refining Unit 20]

The hydrogen iodide refining unit 20 includes a filling tower 22 filled with filler and a tank 24 for reserving a refining solution. The filling tower 22 carries out a gas-liquid contact between crude hydrogen iodide gas produced in the hydrogen iodide producing unit 10 and supplied to the filling tower 22 via a line 16 and the refining solution. The refining solution has been already explained in Embodiment 1 and therefore an explanation thereof is omitted here.

Specifically, the hydrogen iodide refining unit 20 is a counterflow gas-liquid contact device in which a refining solution flows via a line 28 connected with the top of the filling tower 22 and crude hydrogen iodide gas containing impurities is introduced via a line 16 connected with the downstream of the tower, or a parallel flow gas-liquid contact device in which both of the refining solution and the crude hydrogen iodide gas are introduced from the upperstream of the tower. FIG. 1 shows a case where the hydrogen iodide refining unit 20 is the counterflow gas-liquid contact device.

Consequently, impurities in the crude hydrogen iodide gas, such as iodine are absorbed by the refining solution which has contacted with the crude hydrogen iodide gas inside the filling tower 22. As a result, it is possible to obtain hydrogen iodide gas with high purity without any troublesome process in the lower part of the filling tower 22. Hydrogen iodide gas with high purity thus obtained is supplied to the iodine compound producing unit 30 via a line 26.

It is preferable that the refining solution having absorbed impurities such as iodine is returned to the upper part of the filling tower 22 by a circulating pump difficult to be eroded by iodine, hydrogen iodide, and hydriodic acid while the line 28 is cooled by a cooler. This allows further reducing water in the obtained hydrogen iodide gas.

Filler to fill the filling tower 22 is not particularly limited as long as the filler is not eroded or difficult to be eroded by iodine, hydrogen iodide, and a hydrogen iodide solution and the filler increases an area of contact between the refining solution and the crude hydrogen iodide gas. Specific examples of the filler include Hastelloy, various ceramics, and glass. The shape of the filler is not particularly limited and may be spherical, column-like (cylindrical), ring-shaped etc. Fillers of the same shape may be used or fillers of different shapes may be used in combination. It is preferable that the material of the filling tower is, as with the material of the filler, not eroded or difficult to be eroded by iodine, hydrogen iodide, and a hydrogen iodide solution.

It is preferable that the size of the filling tower 22 is set appropriately according to the amount of crude hydrogen iodide gas to be refined. Further, it is preferable that the amount of a refining solution to be used and flow rate of the refining solution are set appropriately according to the size of the filling tower 22 to be used, i.e. the amount of crude hydrogen iodide gas to be refined.

The hydrogen iodide refining unit 20 may be a device using a batch-type refining tank instead of a device using the filling tower 22. That is, the hydrogen iodide refining unit 20 may be a device for flowing crude hydrogen iodide gas including impurities such as iodine into a refining tank that reservoirs a refining solution.

Also in this case, impurities such as iodide in the crude hydrogen iodide gas flown into the refining tank are absorbed by the refining solution. Consequently, it is possible to easily obtain hydrogen iodide gas with high purity without any troublesome process.

In a case where water in the refined hydrogen iodide gas is required to be as little as possible, it is preferable to provide a cooler for cooling the refining tank so that the refining tank is always kept at a predetermined temperature or less, or to use a refining solution cooled in advance.

Also in a case of using a batch-type refining tank, the amount of a refining solution to be reservoired in a reservoir tank, the speed of flowing crude hydrogen iodide gas, and the amount of crude hydrogen iodide gas to be flowed etc. may be set appropriately according to the amount of crude hydrogen iodide gas to be refined.

Solubility of impurities such as iodine in crude hydrogen iodide gas to a refining solution is limited. Therefore, both in cases of using the filling tower 22 and using a batch-type refining tank, when impurities such as iodine get oversaturated and deposited as solid, it is preferable to replace the current refining solution with a new one. At that time, it is preferable that iodine dissolved in the refining solution is condensed and recovered as solid iodine. The recovered iodine may be reused for a reaction for producing hydrogen iodide.

[Iodine Compound Producing Unit 30]

The iodine compound producing unit 30 includes: an iodine compound producing tower 32 for contacting hydrogen iodide gas supplied via the line 26 and a reaction material solution supplied via a line 38; and a recovery tank 34 for recovering a product of the reaction. The "reaction material solution" in the present embodiment is a term generally indicating the inorganic base compound aqueous solution, the alcohol-containing solution, and the aromatic diazonium solution explained in Embodiment 1. Further, as explained in Embodiment 1, aliphatic iodide and aromatic iodide may be produced using a hydrogen iodide solution, but in the present embodiment, aliphatic iodide and aromatic iodide are produced using hydrogen iodide gas.

Into the iodide compound producing tower 32 is introduced the reaction material solution from the upperstream via a line 38. On the other hand, hydrogen iodide gas is introduced into the iodine compound producing tower 32 in such a manner that the flow path of hydrogen iodide gas is perpendicular to the flow path of the reaction material solution. A gas-liquid contact between hydrogen iodide gas and the reaction material solution occurs in the iodine compound producing tower 32, resulting in a reaction. In order to carry out the gas-liquid contact efficiently, it is preferable to fill the iodine compound producing tower 32 with filler made of a material difficult to be eroded by iodine, hydrogen iodide, and hydriodic acid. Examples of the material of the filler include Hastelloy, various ceramics, and glass. Examples of the shape of the filler include sphere, cylinder, and ring. The obtained iodine compound is recovered as a solution in the recovery tank 34 via a line 36. It is preferable that a temperature control mechanism for controlling the temperature of a reaction system, such as a cooling mechanism, is provided at the outside of the iodine compound producing tower 32.

Further, by distilling and removing a solvent from the iodine compound solution recovered by the recovery tank 34, it is possible to obtain a target iodine compound as a solid. A device for distilling and removing a solvent may be a conventional and publicly known device. Specific examples of the device include an evaporator and a lyophilizer.

The iodine compound producing unit 30 may be arranged such that hydrogen iodide gas is directly flown into a tank that reservoirs the reaction material solution. Remaining gas in a hydrogen iodide reaction (including used inert gas in some cases) is extracted from the system 100 for producing an iodine compound via a line 39. The extracted hydrogen gas may be reused in the hydrogen iodide reaction.

[Material of System 100 for Producing Iodine Compound]

In the hydrogen iodide refining unit 20 and the iodine compound producing unit, a member contacting with iodine, hydrogen iodide, and a hydrogen iodide solution is preferably made of a material that is not eroded or difficult to be eroded by iodine, hydrogen iodide, and hydriodic acid.

Examples of such material include Hastelloy, glass, various ceramics, metal tantalum, platinum, polyvinylchloride, and polytetrafluoroethylene.

When the individual units of the system 100 for producing an iodine compound are made of the above material, it is possible to prevent erosion of the system 100 by iodine or hydrogen iodide. This allows the system 100 to have a longer life.

Among the individual units of the system 100, it is preferable that the raw material adjusting unit 1 and the hydrogen iodide producing unit 10 have a resistance to a high temperature as well as the raw material adjusting unit 1 and the hydrogen iodide producing unit 10 are not eroded or difficult to be eroded by iodine and hydrogen iodide.

Specifically, the raw material adjusting unit 1 is preferably made of a material having a heat resistance up to approximately 200° C., since the raw material adjusting unit 1 is heated up to approximately 200° C. at highest in melting solid iodine. Examples of such material include Hastelloy, glass, various ceramics, metal tantalum, platinum, and polytetrafluoroethylene.

Further, the hydrogen iodide producing unit 10 is preferably made of a material having a heat resistance up to not less than 350° C. since the hydrogen iodide producing unit 10 is exposed to mixture gas or crude hydrogen iodide gas heated up to approximately 350° C. in a reaction for synthesizing hydrogen iodide.

Examples of such material include Hastelloy, various ceramics, heat-resistant glass, and platinum.

When the raw material adjusting unit 1 and the hydrogen iodide producing unit 10 are made of such anti-heat material, it is possible to prevent deterioration of the units due to a high temperature. This allows the system 100 for producing an iodine compound to have a further longer life.

The iodine melting pot 4 in the raw material adjusting unit 1 may be arranged such that a surface that contacts with iodine (in a liquid form or a gas form) is subjected to, for example, a lining process or coating process using a material selected from Hastelloy, heat-resistant glass, ceramics, metal tantalum, platinum, and polytetrafluoroethylene. Further, the filling tower 22 (or refining tank), the tank 24, and the iodine compound producing tower 32 in the hydrogen iodide refining unit 20 and the iodine compound producing unit 30 may be arranged such that a surface that contacts with iodine and hydrogen iodide is subjected to, for example, a lining process or coating process using a material selected from Hastelloy, glass, ceramics, metal tantalum, platinum, polyvinylchloride and polytetrafluoroethylene. In the hydrogen iodide producing unit 10, only the hydrogen iodide producing tower 12 is requested to be made of the material selected from Hastelloy, heat-resistant glass, ceramics, and platinum, and the catalyst layer heater 13 is not necessarily requested to be made of the material.

Further, lines connected to the individual units are preferably made of the same materials as those for the individual units.

In the system 100 for producing an iodine compound, it is preferable that the lines are heated up to dew-point temperatures of iodine and hydrogen iodide or more in order to prevent the lines from being clogged due to deposition and solidification of iodine.

[Advantages in Using the System and Method of the Present Invention]

As described above, in the system and method of the present invention for producing an iodine compound, crude hydrogen iodide gas is produced by a gas phase catalytic reduction reaction using gaseous iodine and hydrogen. This makes it unnecessary to perform a troublesome process such as removal of byproducts in refining hydrogen iodide from crude hydrogen iodide gas. This provides easily and efficiently hydrogen iodide with high purity and reduces costs for production. Further, when an iodine compound is produced using hydrogen iodide gas thus obtained, it is possible to easily and efficiently obtain various iodine compounds, thereby providing the iodine compounds at low prices.

The present invention is not limited to the description of the embodiments above, but may be altered by a skilled person within the scope of the claims. An embodiment based on a proper combination of technical means disclosed in different embodiments is encompassed in the technical scope of the present invention.

The following explains a method for producing an iodine compound in more detail with reference to Examples. It should be noted that the present invention is not limited to Examples below and details thereof may be varied in many ways.

EXAMPLES

Example 1

Melting of Solid Iodine

In the present Example, a glass-lined vessel with a jacket, having an internal volume of 2 L, was used as the iodine melting pot 4. The vessel was provided with a flowing tube for flowing hydrogen-containing gas into a melted iodine liquid and a drain tube for draining hydrogen-containing gas and gaseous iodine.

1.5 kg of solid iodine was put in the iodine melting pot 4 and then silicon oil was flown in a jacket to melt solid iodine, so that the temperature of melted iodine was kept at 120° C. while hydrogen-containing gas was flown into melted iodine. Subsequently, 450 ml/min of hydrogen was supplied to the melted liquid iodine so as to obtain 75 ml/min of gaseous iodine.

In the present example, one more solid iodine melting pot was provided in a production line in parallel with the iodine melting pot 4 in order to compensate deficiently supplied iodine, and the two pots were switched per predetermined time, allowing continuous catalytic reduction reaction.

(Adjustment of Mixture Gas)

A mixture gas of hydrogen and gaseous hydrogen thus obtained was introduced into a cylinder (mixer section 8) made of Hastelloy of 20 mm in internal diameter and 50 mm in length, filled with glass beads of 3 mm in particle size, so that the mixture gas was adjusted to an even mixture gas.

A sheathed heater was provided at outside of the mixer section 8 so that the temperature of the mixture gas in the mixer section 8 was kept at 200° C. A line connecting the mixer section 8 with the iodine melting pot 4 was kept warm from outside so as to prevent condensation of iodine.

(Catalytic Reduction Reaction)

The even mixture gas adjusted by the mixer section 8, whose flow rate of hydrogen was 450 ml/min and whose flow rate of gaseous iodine was 75 ml/min, was subjected to a gas phase catalytic reduction reaction in the hydrogen iodide producing section 10 so as to produce hydrogen iodide. The catalyst used here was a platinum catalyst obtained by causing spherical alumina of 3 mm in particle size to support 1 g/L of platinum (indicating 1 g of platinum per 1 litter of support). The catalyst was used while filled in a Hastelloy cylinder heated from the outside. The temperature of the catalyst was set to 350° C. The entry of the catalyst layer 12a was filled with glass beads of 5 mm in particle size in order to pre-heat the even mixture gas.

Here, a part of crude hydrogen iodide gas at the exit of the hydrogen iodide producing tower was absorbed in water and subjected to chemical analysis so as to determine the quantities of produced hydrogen iodide and unreacted iodine. The results of the determination showed that the conversion rate of iodine was 98.0%, the yield of hydrogen iodide was 98.0%, and the weight ratio of unreacted iodine to produced hydrogen iodide was 2/98.

The catalytic reduction reaction was carried out continuously for 100 hours. As a result, the conversion rate of iodine was 97.9% and the yield of hydrogen iodide was 97.9% and activity of the catalyst was kept stable.

(Process for Removing Unreacted Iodine)

A vertical type glass absorption tube obtained by filling a 20 ml filling tube with ring-shaped magnetic filler was provided, and a saturated hydrogen iodide aqueous solution was circulated by a pump between an upper part and a lower part in the glass absorption tube so that the solution flowed down from the upper part to the lower part. A flow rate of the saturated hydrogen iodide aqueous solution was set to 50 ml/min. Subsequently, crude hydrogen iodide gas obtained by the catalytic reduction reaction was introduced from the upper part of the glass absorption tube and subjected to a parallel flow gas-liquid contact, so that unreacted iodine was absorbed by the unsaturated hydrogen iodide aqueous solution. A part of gas exhausted from a glass absorption tube was caused to be absorbed by water and subjected to chemical analysis so as to determine the quantities of iodine and hydrogen iodide.

The results of the determination showed that the conversion rate of iodine was 98.0%, the yield of hydrogen iodide was 98.0%, and the weight ratio of unreacted iodine to produced hydrogen iodide was 0.01/99.99. This confirmed that unreacted iodine could be sufficiently removed from crude hydrogen iodide gas.

(Production of Iodine Compound)

In the present Example, potassium iodide was produced using a batch-type device. There was prepared a 200 ml four-neck flask filled with 20.1 g of 48 wt % potassium hydroxide aqueous solution prepared using potassium hydroxide with 96 wt % purity and with 100 g of ion exchange water. Refined hydrogen iodide gas was flown into the four-neck flask so that neutralization reaction occurs between hydrogen iodide and potassium hydroxide. Flowing of hydrogen iodide gas was carried out while continuously observing pH value of a reaction liquid via a pH meter, and was stopped at the time when pH value of the reaction aqueous solution became 5.72, so as to produce a potassium iodide aqueous solution with high purity.

In order to determine the purity of obtained potassium iodide, the reaction liquid was wholly condensed by a rotational evaporator, and then sufficiently dried to obtain solid potassium iodide. The result of analyzing the solid potassium iodide showed that its purity was 99.8 wt %.

Comparative Example 1

200 g of iodine was put in a 1 L flask, and 92.9 g of a 47.6% potassium hydroxide aqueous solution and 20.5 g of ion exchange water were poured into the flask so as to dissolve iodine. 43.7 g of 87.1% formic acid aqueous solution was added to the flask little by little. All of the formic acid aqueous solution was added for 2 hours, and after the reaction liquid stopped to bubble, the reaction liquid was stirred for 1 hour while heated, so that the reaction proceeded. After the reaction, the reaction liquid was flown in an active carbon layer and unreacted formic acid was absorbed by the active carbon layer. Thus, a potassium iodide aqueous solution was obtained.

In order to determine the purity of the obtained potassium iodide, the whole amount of the potassium iodide aqueous solution was condensed, and crystals thereof were deposited and dried. The purity of the obtained potassium iodide was 99.5%.

In the production method of Comparative Example 1, formic acid was used in the reduction reaction. However, the reduction reaction using formic acid had a low reaction speed. Accordingly, completion of the reaction, i.e. production of potassium iodide took much time. On the other hand, a neutralization reaction between hydrogen iodide and potassium hydroxide in Example 1 had a high reaction speed. Accordingly, completion of the reaction did not take much time. That is, it was confirmed that the method of Comparative Example 1 has a lower productivity than the method of Example 1.

Further, since the reduction reaction using formic acid has a low reaction speed, a production device is required to be a batch-type one. In Example 1, for the purpose of comparison with Comparative Example 1, the method for producing a potassium iodide aqueous solution was carried out using a batch-type production device. Alternatively, the production device may be arranged such that the iodine compound producing tower is filled with filler in order to increase a gas-liquid contact efficiency, adjusts concentration and supply speed of a potassium hydroxide aqueous solution, and manages pH value of the reaction liquid, thereby continuously producing the potassium iodide aqueous solution. Such continuous production method allows further increasing productivity of the potassium iodide aqueous solution than the method using a batch-type production device.

Example 2

Method for Producing Hydrogen Iodide-Containing Gas

A mixture gas whose flow rate of hydrogen was 450 ml/min and whose flow rate of gaseous iodine was 75 ml/min was caused to contact with a platinum catalyst heated up to 350° C. The platinum catalyst was obtained by causing spherical alumina of 3 mm in particle diameter to support 1 g of platinum per 1 L of the support. As a result of the contact, hydrogen iodide-containing gas (crude hydrogen iodide gas) was produced. A weight ratio of unreacted iodine to produced hydrogen iodide in the hydrogen iodide-containing gas was 2/98 (other component was hydrogen gas).

(Refinement of Hydrogen Iodide-Containing Gas)

There was provided a vertical glass absorption tube (which may be hereinafter referred to as merely an absorption tube) obtained by filling a 20 ml filling tube with ring-shaped magnetic filler, and a saturated hydrogen iodide aqueous solution was circulated by a pump between the upper part and the lower part of the absorption tube so that the solution flowed down from the upper part to the lower part. The flow rate of the unsaturated hydrogen iodide aqueous solution was set to 50 ml/min. Subsequently, the produced hydrogen iodide-containing gas was introduced to the lower part of the absorption tube, and the unreacted iodine was absorbed by the saturated hydrogen iodide aqueous solution.

(Measurement of Concentration of Iodine in Hydrogen Iodide)

The hydrogen iodide-containing gas having passed through the absorption tube (i.e. hydrogen iodide) was absorbed by water and recovered as an aqueous solution. The amounts of iodine and hydrogen iodide in the recovered hydrogen iodide aqueous solution were measured by titrimetric analysis using a sodium thiosulfate aqueous solution and a sodium hydroxide aqueous solution, respectively.

The result of the measurement shows that a ratio of iodine to hydrogen iodide in the hydrogen iodide aqueous solution was 0.01/99.99. This shows that hydrogen iodide with high purity can be obtained very easily and efficiently.

Reference Example 3

Method for Producing Hydrogen Iodide-Containing Gas

Water (100 g; 5.556 mol) and red phosphorus (9 g; 0.290 mol) were put in a 300 ml four-neck flask, and the resultant was stirred while cooled down to 0° C. Iodine (200 g; 0.788 mol) was divided into four parts and each part was added to the resultant separately, and a reaction was carried out for 2 hours to synthesize hydrogen iodide. Subsequently, under a normal pressure, 30 ml/min of nitrogen gas was flown into the four-neck flask while heating the four-neck flask, so that hydrogen iodide excessive to an azeotropic composition (weight ratio) of 57.6% between hydrogen iodide and water under a normal pressure was produced as hydrogen iodide-containing gas.

The produced hydrogen-containing gas was absorbed by water, and the amounts of iodine and hydrogen iodide in the hydrogen iodide-containing gas were measured by titrimetric analysis using sodium thiosulfate and sodium hydroxide, respectively. The result of the measurement showed that a ratio of iodine to hydrogen iodide in the hydrogen iodide-containing gas was 0.9/99.1.

(Refinement of Hydrogen Iodide-Containing Gas)

There was provided a vertical glass absorption tube (which may be hereinafter referred to merely as an absorption tube) obtained by filling a 20 ml filling tube with ring-shaped magnetic filler, and a saturated hydrogen iodide aqueous solution was circulated by a pump between the upper part and the lower part of the absorption tube so that the solution flowed down from the upper part to the lower part. The flow rate of the saturated hydrogen iodide aqueous solution was set to 50 ml/min. Subsequently, the produced hydrogen iodide-containing gas was introduced to the lower part of the absorption tube, and the unreacted iodine was absorbed by the saturated hydrogen iodide aqueous solution.

(Measurement of Concentration of Iodine in Hydrogen Iodide)

The hydrogen iodide-containing gas having passed through the absorption tube (i.e. hydrogen iodide) was absorbed by water and recovered as an aqueous solution. The amounts of iodine and hydrogen iodide in the recovered hydrogen iodide were measured by titrimetric analysis using a sodium thiosulfate aqueous solution and a sodium hydroxide aqueous solution, respectively.

The result of the measurement shows that a ratio of iodine to hydrogen iodide in the hydrogen iodide aqueous solution was 0.01/99.99. This shows that hydrogen iodide with high purity can be obtained very easily and efficiently.

Example 4

Hydrogen iodide was produced similarly as in Example 2 except that the solvent for a saturated hydrogen iodide solution was changed from water to acetone. The amount of iodine in a hydrogen iodide aqueous solution obtained by dissolving the produced hydrogen iodide in water was measured.

The result of the measurement shows that a ratio of iodine in hydrogen iodide to hydrogen iodide was 0.01/99.99. This shows that hydrogen iodide with high purity can be obtained very easily and efficiently.

Example 5

Hydrogen iodide was produced similarly as in Example 2 except that the medium for a saturated hydrogen iodide solution was changed from water to a saturated hydrogen iodide aqueous solution containing 10 wt % potassium iodide. The amount of iodine in a hydrogen iodide aqueous solution obtained by dissolving the produced hydrogen iodide in water was measured.

The result of the measurement shows that a ratio of iodine in hydrogen iodide to hydrogen iodide was 0.01/99.99. This shows that hydrogen iodide with high purity can be obtained very easily and efficiently.

Example 6

Hydrogen iodide was produced similarly as in Example 2 except that the medium for a saturated hydrogen iodide solution was changed from water to tetrahydrofuran. The amount of iodine in a hydrogen iodide aqueous solution obtained by dissolving the produced hydrogen iodide in water was measured.

The result of the measurement shows that a ratio of iodine in hydrogen iodide to hydrogen iodide was 0.01/99.99. This shows that hydrogen iodide with high purity can be obtained very easily and efficiently.

Example 7

Hydrogen iodide was produced similarly as in Example 2 except that the medium for a saturated hydrogen iodide solution was changed from water to toluene. The amount of iodine in a hydrogen iodide aqueous solution obtained by dissolving the produced hydrogen iodide in water was measured.

The result of the measurement shows that a ratio of iodine in hydrogen iodide to hydrogen iodide was 0.01/99.99. This shows that hydrogen iodide with high purity can be obtained very easily and efficiently.

Comparative Example 2

Hydrogen iodide was produced similarly as in Example 2 except that the saturated hydrogen iodide solution was replaced with ion exchange water. A ratio of iodine in hydrogen iodide to hydrogen iodide was calculated in such a manner that the amount of iodine and the amount of hydrogen iodide in ion exchange water 1 hour after introduction of hydrogen iodide-containing gas into an absorption tube were measured similarly as in Example 2.

The result shows that a ratio of iodine in hydrogen iodide to hydrogen iodide was 2/98. That is, no change was observed in the purity of hydrogen iodide.

As described above, in the system of the present invention for producing an iodine compound, crude hydrogen iodide gas is produced by a gas phase catalytic reduction reaction using gaseous iodine and hydrogen. Consequently, when refining hydrogen iodide from crude hydrogen iodide gas, it is unnecessary to carry out a conventional troublesome process such as removal of byproducts. This yields an effect of easily and efficiently obtaining hydrogen iodide with high purity, and reducing costs for production.

Further, by producing an iodine compound using hydrogen iodide gas thus obtained, it is possible to obtain hydrogen iodide easily and efficiently, and to reduce the price of the iodine compound.

Further, in the present specification etc., hydrogen iodide is refined from hydrogen iodide-containing gas by a gas-liquid contact between the hydrogen iodide-containing gas and a refining solution which dissolves a material other than hydrogen iodide in the hydrogen iodide-containing gas but does not dissolve hydrogen iodide. Consequently, it is possible to obtain hydrogen iodide with high purity while hardly impairing hydrogen iodide in the hydrogen iodide-containing gas.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The system of the present invention for producing an iodine compound allows producing an iodine compound with high purity easily, efficiently, and at low cost. Consequently, the iodine compound with high purity obtained in the system of the present invention can be preferably used in reactions using the iodine compound as a raw material.

Further, the method of the present invention for producing hydrogen iodide allows efficiently producing hydrogen iodide with high purity and therefore is preferably used in industrial production of hydrogen iodide. Further, hydrogen iodide or hydriodic acid with high purity obtained by the method is very preferably used in a further reaction using hydrogen iodide or hydriodic acid.

The invention claimed is:

1. A system for producing an iodine compound by using hydrogen iodide gas, comprising a hydrogen iodide refining unit including a refining device for causing crude hydrogen iodide gas to contact with a refining solution so as to obtain hydrogen iodide gas, the crude hydrogen iodide gas being produced by causing hydrogen gas to contact with gaseous iodine in a presence of a catalyst, the refining solution dissolving a material other than hydrogen iodide and not dissolving hydrogen iodide in the crude hydrogen iodide gas.

2. The system as set forth in claim 1, further comprising:
a raw material adjusting unit including an iodine reservoir tank for reservoiring liquid iodine obtained by melting solid iodine and a hydrogen supplier for supplying hydrogen-containing gas, the raw material adjusting unit supplying the hydrogen-containing gas from the hydrogen supplier to at least one of the liquid iodine reservoired in the iodine reservoir tank and gaseous iodine obtained by evaporating the liquid iodine so as to obtain a mixture gas including gaseous iodine and hydrogen;
a hydrogen iodide producing unit including a hydrogen iodide producer having a catalyst section made of a catalyst which converts the mixture gas obtained in the raw material adjusting unit into crude hydrogen iodide gas; and
an iodine compound producing unit including an iodine compound producer for causing the hydrogen iodide gas obtained in the hydrogen iodide refining unit to contact with a reaction material reactive to the hydrogen iodide gas so as to produce an iodine compound.

3. The system as set forth in claim 2, wherein the iodine reservoir tank includes a heater for heating the iodine reservoir tank.

4. The system as set forth in claim 2, wherein the hydrogen iodide producing unit further includes a catalyst heater for heating the catalyst section.

5. The system as set forth in claim 1, wherein
the hydrogen iodide refining unit includes a circulating mechanism for circulating a refining solution for removing unreacted iodine from the crude hydrogen iodide gas, and
the circulating mechanism includes a cooler for cooling the refining solution when the refining solution is returned to the refining device.

6. The system as set forth in claim 2, wherein the iodine compound producer is provided with a flow path via which a solution of the reaction material flows and is connected with a gas nozzle via which the hydrogen iodide gas is introduced into the flow path.

7. The system as set forth in claim 2, wherein the raw material adjusting unit further includes a gas mixer for making even composition between the gaseous iodine and the hydrogen in the mixture gas.

8. The system as set forth in claim 2, wherein the raw material adjusting unit further includes a mixture gas heater for heating the mixture gas.

9. The system as set forth in claim 8, wherein the mixture gas heater is included in the gas mixer.

10. The system as set forth in claim 9, wherein the mixture gas heater and the gas mixer are included in the hydrogen iodide producer.

11. The system as set forth in claim 2, wherein a surface of the raw material adjusting unit which contacts with iodine is made of at least one material selected from the group consisting of Ni—Mo—Fe—Cr metal alloy, Ni—Cr—Cu—Mo metal alloy, Ni—Si metal alloy, glass, ceramics, metal tantalum, platinum, and polytetrafluoroethylene.

12. The system as set forth in claim 2, wherein a surface of the hydrogen iodide producing unit which contacts with hydrogen iodide and iodine is made of at least one material selected from the group consisting of Ni—Mo—Fe—Cr metal alloy, Ni—Cr—Cu—Mo metal alloy, Ni—Si metal alloy, heat-resistant glass, ceramics, and platinum.

13. The system as set forth in claim 2, wherein each of the hydrogen iodide refining unit and the iodine compound producing unit is made of at least one material selected from the group consisting of Ni—Mo—Fe—Cr metal alloy, Ni—Cr—Cu—Mo metal alloy, Ni—Si metal alloy, glass, ceramics, metal tantalum, platinum, polyvinyl chloride, and polytetrafluoroethylene.

14. The system as set forth in claim 1, wherein the refining device in the hydrogen iodide refining unit includes a filling tower filled with filler, and the filling tower is provided with an entrance via which the crude hydrogen iodide gas and a refining solution for removing unreacted iodine from the crude hydrogen iodide gas are introduced.

15. The system as set forth in claim 1, wherein the refining device in the hydrogen iodide refining unit includes a refining tank for reservoiring a refining solution for removing unreacted iodine from the crude hydrogen iodide gas and a supplier for supplying the crude hydrogen iodide gas to the refining tank.

16. A method for producing an iodine compound by using hydrogen iodide gas, comprising a hydrogen iodide refining step of
causing crude hydrogen iodide gas to contact with a refining solution so as to obtain hydrogen iodide gas, the crude hydrogen iodide gas being produced by causing hydrogen gas to contact with gaseous iodine in a presence of a catalyst, the refining solution dissolving a material other than hydrogen iodide and not dissolving hydrogen iodide in the crude hydrogen iodide gas.

17. The method as set forth in claim 16, wherein the refining solution in the hydrogen iodide refining step is a saturated hydrogen iodide solution.

18. The method as set forth in claim 17, wherein a solvent for the saturated hydrogen iodide solution is at least one selected from the group consisting of water, ketones, ethers, alcohols, and aromatic compounds.

19. The method as set forth in claim 16, wherein in the hydrogen iodide refining step, a gas-liquid contact between the crude hydrogen iodide gas and the refining solution is made in a filling tower filled with filler.

20. The method as set forth in claim 16, wherein in the hydrogen iodide refining step, the gas-liquid contact is made by flowing the crude hydrogen iodide gas into the refining solution.

21. The method as set forth in claim 16, wherein the catalyst is at least one platinum group element dispersedly supported on at least one of oxide and active carbon.

22. The method as set forth in claim 16, further comprising
a gaseous iodine producing step of causing liquid iodine obtained by heating solid iodine to contact with gas containing at least one of gas inert to the liquid iodine and hydrogen so as to obtain gaseous iodine,
a hydrogen iodide producing step of subjecting a mixture gas containing the gaseous iodine and hydrogen to a catalytic reduction in a presence of the catalyst so as to produce crude hydrogen iodide gas, and
an iodine compound producing step of producing an iodine compound by using the hydrogen iodide gas obtained in the hydrogen iodide refining step.

23. The method as set forth in claim 22, wherein a molar ratio of hydrogen to gaseous iodine in the mixture gas is set in a range from 0.5 to 10 before the hydrogen iodide producing step.

24. The method as set forth in claim 22, wherein in the iodine compound producing step, the hydrogen iodide gas is caused to contact with an inorganic base compound solution.

25. The method as set forth in claim 24, further comprising a drying step of drying an inorganic iodide solution obtained in the iodine compound producing step.

26. The method as set forth in claim 22, wherein in the iodine compound producing step, the hydrogen iodide gas or a solution in which the hydrogen iodide gas is dissolved is caused to contact with an alcohol-containing solution or an aromatic diazonium solution.

27. The method as set forth in claim 26, further comprising an organic iodide refining step of refining an organic iodide solution obtained in the iodine compound producing step.

28. Hydrogen iodide obtained in the hydrogen iodide producing step in a method as set forth in claim 16.

29. The hydrogen iodide as set forth in claim 28, wherein a content of iodine in the hydrogen iodide is not more than 2 wt % with respect to 100 wt % of whole components in the hydrogen iodide.

30. Hydriodic acid obtained by dissolving hydrogen iodide as set forth in claim 29 in water.

* * * * *